United States Patent
Nakagawa et al.

(10) Patent No.: US 7,881,684 B2
(45) Date of Patent: Feb. 1, 2011

(54) RECEIVER, FREQUENCY DEVIATION MEASURING UNIT AND POSITIONING AND RANGING SYSTEM

(75) Inventors: Tatsuo Nakagawa, Hachioji (JP); Masayuki Miyazaki, Tokyo (JP); Kenichi Mizugaki, Kokubunji (JP); Ryosuke Fujiwara, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 11/356,171

(22) Filed: Feb. 17, 2006

(65) Prior Publication Data
US 2007/0060079 A1    Mar. 15, 2007

(30) Foreign Application Priority Data
Sep. 9, 2005   (JP) ............................. 2005-261852

(51) Int. Cl.
   H03D 7/16  (2006.01)
   H04W 24/00 (2009.01)
   H04B 15/00 (2006.01)
(52) U.S. Cl. ............... 455/131; 455/456.1; 455/502
(58) Field of Classification Search ........... 455/456.1, 455/404, 136, 555, 456.6; 370/342, 352; 342/442, 444; 368/120; 375/232; 324/765
   See application file for complete search history.

(56) References Cited

U.S. PATENT DOCUMENTS

| | | | |
|---|---|---|---|
| 3,646,452 A | | 2/1972 | Horowitz et al. |
| 4,845,691 A | * | 7/1989 | Itaya et al. ............... 368/120 |
| 5,703,905 A | * | 12/1997 | Langberg ................ 375/232 |
| 5,724,047 A | * | 3/1998 | Lioio et al. ............... 342/442 |
| 6,236,648 B1 | * | 5/2001 | Umetsu ..................... 370/342 |

(Continued)

FOREIGN PATENT DOCUMENTS

EP   0 367 378   7/1989

(Continued)

OTHER PUBLICATIONS

Moe Z. Win et al., "Impulse Radio: How It Works", IEEE Communications Letters, vol. 2, No. 2, Feb. 1998, pp. 36-38.

(Continued)

*Primary Examiner*—Charles N Appiah
*Assistant Examiner*—Kiet Doan
(74) *Attorney, Agent, or Firm*—Stites & Harbison PLLC; Juan Carlos A. Marquez, Esq.

(57) ABSTRACT

In a system for measuring a time difference of arrival of signals for positioning, an accurate time difference is measured by a receiver which is reduced in power consumption, size, and cost. The system comprises a node (under measurement) for transmitting a positioning signal, a reference station for transmitting a reference signal, and a plurality of access points for receiving the positioning signal and reference signal, and a server connected to the plurality of access points through a network. Each of the plurality of access points measures a time difference between the reception of the positioning signal and the reception of the reference signal, and a frequency deviation from the reference station, using a clock signal and a signal for shifting the clock signal, and the server calculates the position of the node based on the measured time difference and frequency deviation.

11 Claims, 19 Drawing Sheets

U.S. PATENT DOCUMENTS

| | | | |
|---|---|---|---|
| 7,173,443 B1 * | 2/2007 | Asami | 324/765 |
| 7,529,551 B2 * | 5/2009 | Tanaka et al. | 455/456.6 |
| 2003/0086339 A1 | 5/2003 | Dally et al. | |
| 2003/0143975 A1 * | 7/2003 | Hernandez et al. | 455/404 |
| 2003/0156671 A1 * | 8/2003 | Lee et al. | 375/355 |
| 2004/0022332 A1 * | 2/2004 | Gupta et al. | 375/343 |
| 2004/0179580 A1 * | 9/2004 | Yamaguchi | 375/141 |
| 2004/0235499 A1 | 11/2004 | Tanaka et al. | |
| 2005/0130669 A1 * | 6/2005 | Mizugaki et al. | 455/456.1 |

FOREIGN PATENT DOCUMENTS

| | | |
|---|---|---|
| JP | 2004-241927 | 2/2003 |
| JP | 2004-254076 | 2/2003 |
| JP | 2004-258009 | 2/2003 |
| JP | 2005-140617 | 11/2003 |
| WO | WO 97/30360 | 2/1997 |

OTHER PUBLICATIONS

European Search Report dated Jun. 19, 2006.
R. Fujiwara et al., "Rapid Signal Acquisition for Low-Rate Carrier-Based Ultra-Wideband Impulse Radio", 2005 IEEE, pp. 4497-4500.
Vincent Coli, "UWB Technology for Location-Aware Networking", RF Design, Primedia Business Magazines & Media, vol. 26, No. 11, Nov. 2003, pp. 36, 38, 40, 42, 44 and 46.
European Search Report dated Sep. 20, 2006.

* cited by examiner

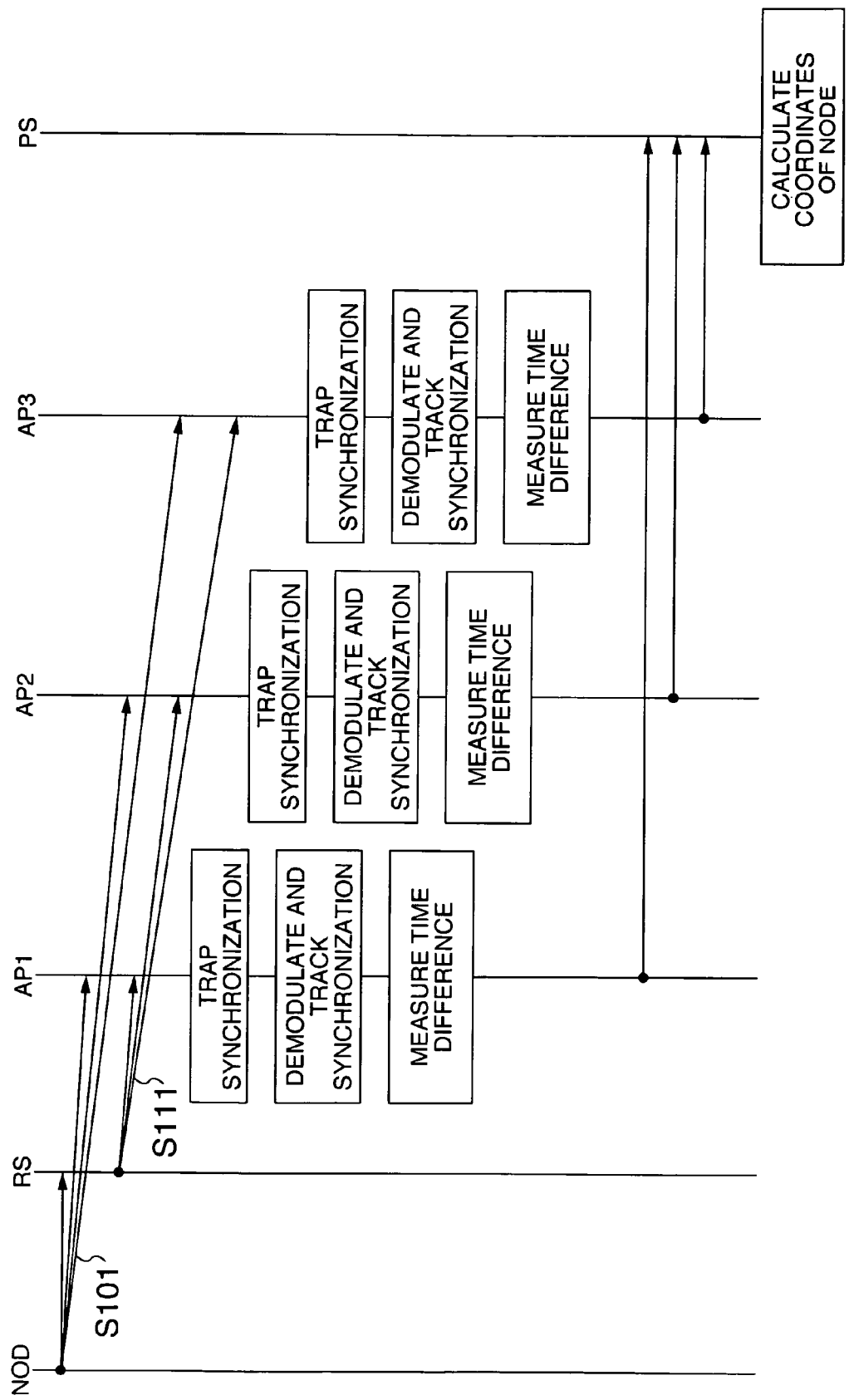

RECEIVER, FREQUENCY DEVIATION MEASURING UNIT AND POSITIONING AND RANGING SYSTEM

CROSS-REFERENCE TO THE RELATED APPLICATION

The present invention is related to a U.S. Ser. No. 10/973,289.

INCORPORATION BY REFERENCE

The present application claims priority from Japanese application JP 2005-261852 filed on Sep. 9, 2005, the content of which is hereby incorporated by reference into this application.

BACKGROUND OF THE INVENTION

The present invention relates to a receiver and a frequency deviation measuring unit which are suitable for measuring the position of a terminal node having radio communication capabilities, and a positioning and ranging system which employs the receiver and frequency deviation measuring unit.

Public attention has been attracted by a wireless sensor network (hereinafter simply called the "sensor net") which includes devices having sensing capabilities installed everywhere around a region to form a network over the air, thereby efficiently capturing information in the real world into an information network such as the Internet. In concept, the sensor net is autonomously built by an infinite number of nodes (terminals), each of which comprises a sensor, a microcomputer, a radio communication device, and a power supply and measures situations relating to persons, objects, environment and the like by the sensor. The sensor net is now under investigation for applications to a variety of fields such as distribution, automobile, agriculture and the like.

To implement a sensor net, nodes must be installed in a region under monitoring to continuously sense the state in the region for a long time. For this purpose, the node is required to be small in size and to consume least possible power. Also, since a large number of nodes are distributed, the management of the nodes is a critical aspect.

Likewise, low power radio communication technologies are required for the sensor net. An ultra-wide band (hereinafter abbreviated as "UWB") communication device is expected for use in the sensor net because of its possible low power consumption and small size. The UWB radio communication is defined to employ radiowaves in a bandwidth equal to or larger than 500 MHz with the ratio of the bandwidth to the center frequency of 20% or more. The UWB communication spreads data over an extremely wide frequency band for transmission and reception, and requires extremely small signal energy per unit frequency band. Accordingly, the UWB communication can communicate without interfering with other communication systems, and can share a frequency band.

Moe Z. Win et al, "Impulse Radio: How It Works," IEEE Communications Letters, Vol. 2, No. 2, pp. 36-38 (February 1998) discloses an example of the UWB communication which is an UWB-IR (Ultra Wide Band—Impulse Radio) communication system that modulates Gaussian monopulses in accordance with a PPM (Pulse Position Modulation) scheme. For establishing the synchronization with such a pulse signal, for example, a method is known to shift a timing at which a template pulse is generated at predetermined intervals to find a correlation (see, for example, JP-A-2004-241927).

Because of its abilities to use pulse signals, the UWB is known to be capable of highly accurate position measurements. For example, JP-A-2004-258009 discloses a ranging/positioning system which utilizes a transmission of packets and associated response procedure between two radios for ranging and positioning. JP-A-2004-254076 discloses a positioning system which comprises a receiver for detecting a change in the distance between a transmitter and a receiver based on a timing adjusting amount when a received pulse waveform is correlated to a template waveform to establish the synchronization.

Also, in a known node position measuring system, a signal from a node is received at a plurality of access points to calculate the position of the node, utilizing time differences of arrival (TDOA) among the access points. For example, JP-A-2005-140617 discloses a positioning method, where a plurality of access points measure a reception time difference between a positioning signal from a node and a reference signal from a reference station to position the node based on the reception time differences utilizing the TDOA.

One of challenges in positioning/ranging systems is improvements in positioning accuracy. The system described in JP-A-2004-258009 requires a high-speed oscillator and a high-speed counter in order to improve the ranging accuracy. Also, while a transmitter and a receiver comprise different clock generators for generating clocks at predetermined frequencies, respectively, the ranging accuracy is affected by the accuracy and stability of each clock generator in each of the transmitter and receiver. In other words, errors and low accuracy in the ranging can be caused by a frequency deviation of the oscillator in one of the transmitter and receiver from the oscillator in the other one.

The system described in JP-A-2004-254076 can detect a change in the distance between a transmitter and a receiver, but cannot identify the position of the transmitter. Also, while each of the transmitter and receiver comprises a different clock generator for generating a clock at a predetermined frequency, the accuracy with which a change in distance is identified is affected by the accuracy and stability of each clock generator in each of the transmitter and receiver. In other words, errors in the ranging can be caused by a frequency deviation of the oscillator in one of the transmitter and receiver from the oscillator in the other one.

In the system which utilizes TDOA for positioning described in JP-A-2005-140617, the positioning accuracy is affected by the accuracy with which the time difference of arrival is measured. Generally, an accurate time difference measurement requires a high-speed oscillator and a high-speed counter, causing an increase in power consumption and circuit scale. Also, the time difference measuring accuracy depends on the accuracy and stability of the frequency generated by the oscillator. In other words, a frequency deviation of the oscillator can cause errors in the time difference measurement. However, an accurate and stable oscillator is expensive, resulting in an increased cost of a device which employs such an oscillator.

On the other hand, the positioning/ranging system is required to reduce power consumption, size and cost of component devices. Therefore, the use of a high-speed, accurate, and stable oscillator and a high-speed counter is not preferable for purposes of measuring a time difference with a high accuracy.

SUMMARY OF THE INVENTION

It is an object of the present invention to provide a receiver which is reduced in power consumption, size, and cost, and is capable of measuring a time difference with a high accuracy for positioning.

Among several aspects of the invention disclosed in the present application, a representative one will be described in brief as follows.

The present invention provides a receiver for receiving a transmission signal from a transmitter. The receiver comprises a reception unit for receiving the transmission signal, an A/D conversion module for converting the transmission signal from an analog form to a digital form, a phase shift unit for shifting the phase of a timing at which the A/D conversion module performs the analog-to-digital conversion, and a time difference measurement module for measuring a reception time difference between a first transmission signal and a second transmission signal using the value by which the phase is shifted in the phase shift unit.

According to the present invention, an accurate time difference can be measured using a low-speed clock, control signal, and counter, so that accurate positioning is achieved by a receiver which is reduced in power consumption, size, and cost, without using a high-speed clock or counter.

Other objects, features and advantages of the invention will become apparent from the following description of the embodiments of the invention taken in conjunction with the accompanying drawings.

BRIEF DESCRIPTION OF THE DRAWINGS

FIG. 3 is a sequence diagram showing an outline of transmission and reception of signals in the positioning/ranging system according to the first embodiment;

DESCRIPTION OF THE EMBODIMENTS

Several embodiments of a receiver and a positioning/ranging system according to the present invention will be described below in detail with reference to the accompanying drawings.

First Embodiment

A receiver according to a first embodiment of the present invention, and a positioning/ranging system using the same will be described with reference to FIGS. 1 to 12. First, the configuration and operation of the system in the first embodiment will be outlined with reference to FIGS. 1 to 3.

Figure 1:
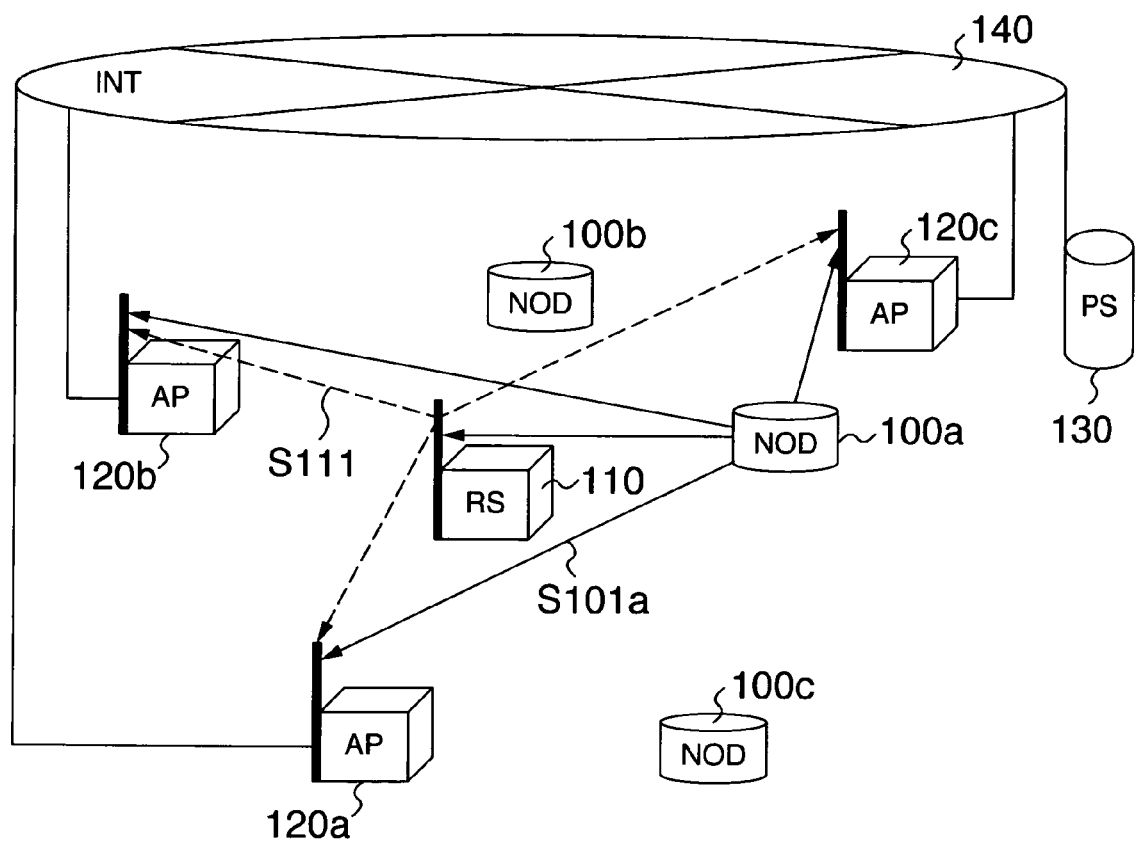
FIG. 1 is a schematic diagram illustrating the configuration of a positioning system according to a first embodiment of the present invention.

FIG. 1 illustrates the configuration of the positioning/ranging system according to the first embodiment of the present invention. The positioning/ranging system comprises a plurality of nodes (NOD) 100 (100a, 100b, . . . ) (which are intended for positioning) each for transmitting a positioning signal; a reference station (RS) 110 for transmitting a reference signal; a plurality of access points (AP) 120 (120a, 120b, 120c) each for receiving the positioning signal and reference signal; a positioning server (PS) 130; and a network (INT) 140 for interconnecting the respective access points 120 and positioning server 130. It should be noted that the suffixes a, b, c of a reference numeral indicate the same components, and a reference numeral without suffix collectively designates the same components. Also, while either of NOD, RS, AP, and PS has transmission/reception functions, the following description will be centered on the transmission/reception functions required in regard to the embodiments of the present invention for simplicity.

The configuration of the respective components, which make up the system of the present invention, will be outlined by way of example with reference to FIGS. 2A to 2D.

Figure 2A:
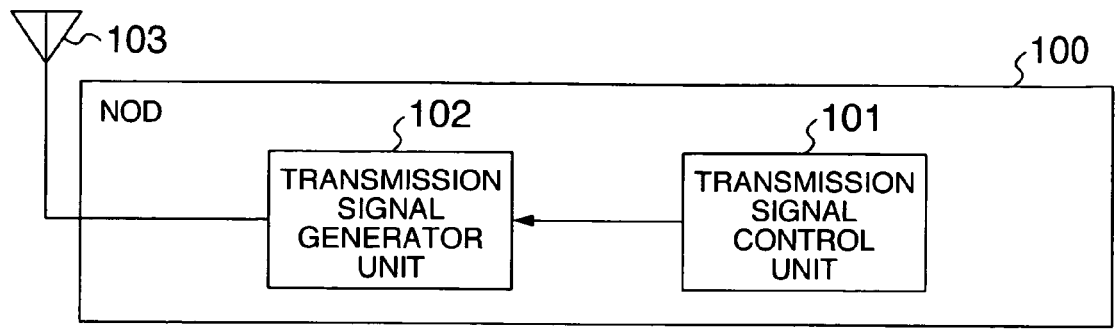
FIG. 2A is a block diagram illustrating an exemplary configuration of a node (NOD) in the first embodiment.

FIG. 2A is a block diagram illustrating an exemplary configuration of the node (NOD) 100. Each node comprises a signal transmission control unit 101, a signal generation unit 102, and an antenna 103. The node 100 generates a positioning signal S101 in response to an instruction from the signal transmission control unit 101 based on information from a sensor and a timer contained in or connected to the node 100, and transmits the positioning signal S101 from the antenna 103. The positioning signal S101 has a waveform uniquely assigned to each node, so that the positioning signal can be identified as to from which node it has been transmitted.

Figure 2B:
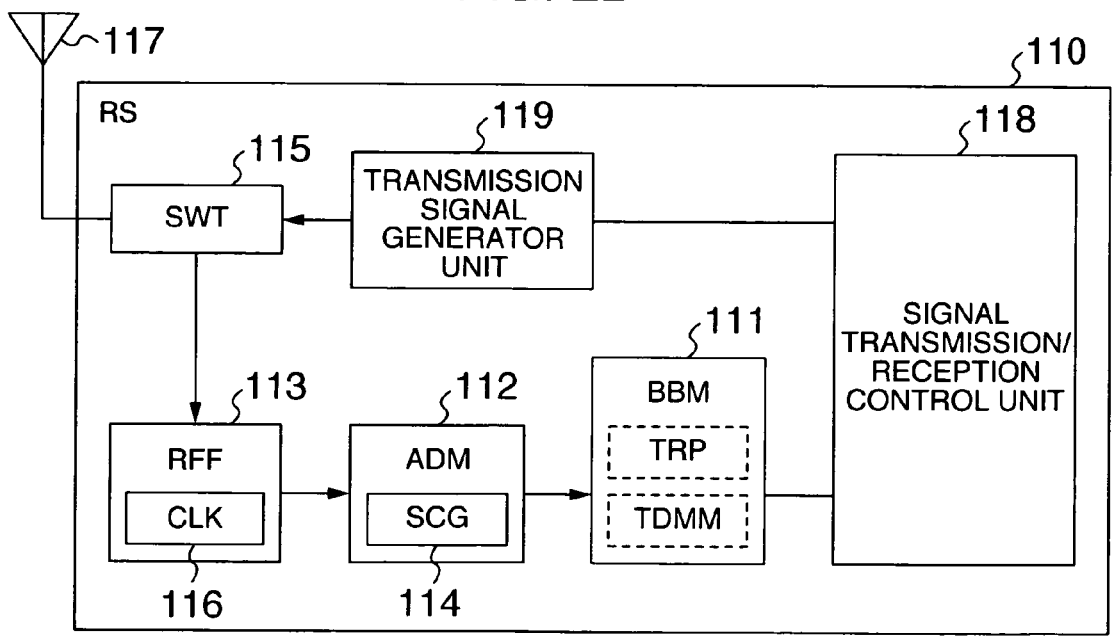
FIG. 2B is a block diagram illustrating an exemplary configuration of a reference station (RS) in the first embodiment.

FIG. 2B is a block diagram illustrating an exemplary configuration of the reference station (RS) 110. The reference station 110 comprises a baseband module (BBM) 111, an analog-to-digital conversion module (hereinafter simply called the "A/D conversion module") (ADM) 112, an RF front end unit (RFF) 113, a transmission/reception switch (SWT) 115, an antenna (ANT) 117, a signal transmission/reception control unit 118, a transmission signal generator unit 19. The ADM 112 and RFF 113 have an SCG 114 and a CLK 116, respectively, which are sources for generating clock signals to which the synchronization should be established. The reference station 110 has functions of receiving the positioning signal S101 transmitted from the node 100, and subsequently transmitting a reference signal S111, having a unique waveform, generated by the transmission signal generator unit 119.

Figure 2C:
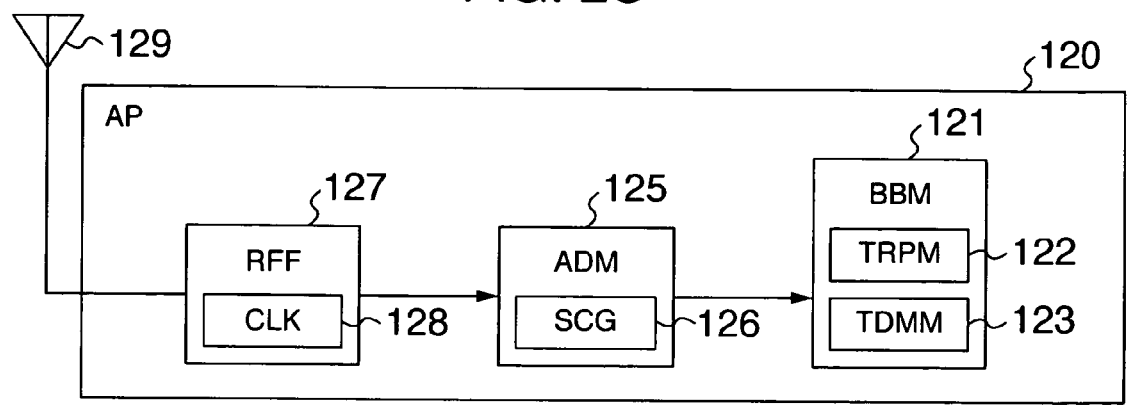
FIG. 2C is a block diagram illustrating an exemplary configuration of an access point (AP) in the first embodiment.

FIG. 2C is a block diagram illustrating an exemplary configuration of the access point (AP) 120. The access point 120 comprises a baseband module (BBM) 121, an analog-to-digital conversion module (ADM) 125, an RF front end unit (RFF) 127, and an antenna (ANT) 129. The ADM 125 and RFF 127 have an SCG 126 and CLK 128, respectively, which are sources for generating clock signals to which the synchronization should be established. The baseband module 121 comprises a function of identifying a node or a reference station which has transmitted a signal based on information included in a received signal, which enables the baseband module 121 to identify the source station. Further, the baseband module 121 comprises a synchronization trap module (TRPM) 122 for generating a shift signal for varying the phase of the clock signal generated by the SCG 126 to vary the phase of the clock signal for trapping the synchronization of a transmission signal with the clock signal, and a time difference measurement module (TDMM) 123 for measuring a difference between a time at which a positioning signal was received and a time at which a reference signal was received using the clock signal and shift signal.

As indicated by dotted line blocks in FIG. 2B, the reference station (RS) 110 may also comprise a synchronization trap module (TRPM) and a time difference measurement module (TDMM), like the access point (AP) 120. Also, the access point (AP) 120 may also have a transmission function similar to that of the reference station (RS) 110.

Figure 2D:
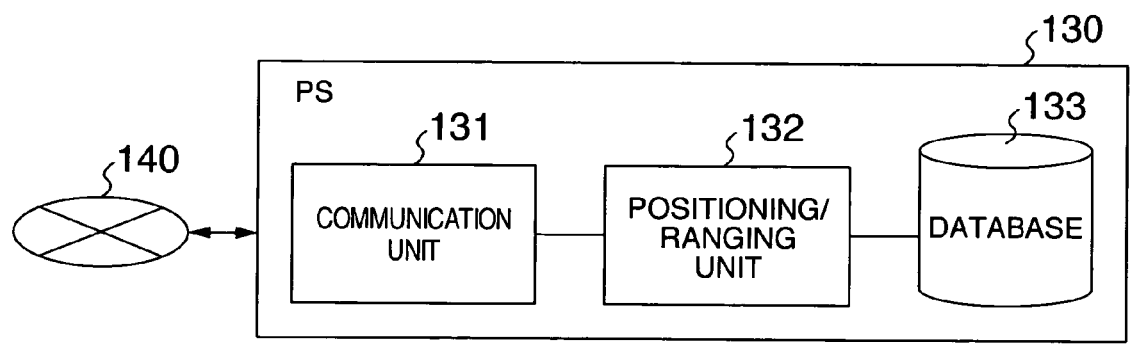
FIG. 2D is a block diagram illustrating an exemplary configuration of a positioning server (PS) in the first embodiment.

FIG. 2D is a block diagram illustrating an exemplary configuration of the positioning server (PS) 130. The positioning server 130 comprises a communication unit 131, a positioning/ranging unit 132, and system information database 133. The communication unit 131, which functions as an interface for connecting the positioning server 130 to the network 140, receives a positioning information notification sent from an access point and sends the positioning information notification to the positioning/ranging unit 132. The positioning/ranging unit 132 calculates the position of a node 100 based on information on a signal reception time difference at each access point included in the positioning information notification, as well as information on the positions of the respective access points and reference station, and the like retrieved from the system information database 133.

FIG. 3 is a sequence diagram showing an outline of a signal transmission/reception sequence in the positioning/ranging system of the first embodiment.

The node 100 transmits a transmission signal including the positioning signal S101 to neighboring reference station 110 and access points 120 at an arbitrary time at which the node 100 desires the calculation of its position, for example, on a periodic basis or at regular intervals, or when a sensor provided in the node detects an abnormal value. The reference station 110 transmits a transmission signal including the reference signal S111 after receiving the transmission signal including the positioning signal S101. Each access point 120 sends positioning information, for example, a time difference between a time at which the positioning signal was received and a time at which the reference signal was received, ID for identifying the access point, and other information, to the positioning server 130 through the network 140.

Here, upon receipt of the transmission signal, each access point 120 performs synchronization trap of the transmission signal, for example, the positioning signal with a sampling clock. After the establishment of the synchronization trap, the access point 120 demodulates the transmission signal, and tracks the synchronization. In parallel with the processing involved in the reception of the transmission signal such as the synchronization trap, demodulation, tracking of the synchronization, and the like, each access point 120 measures a difference between the time at which the positioning signal was received and the time at which the reference signal was received, and sends information based on the result of the measurement to the positioning server 130.

The positioning server 130 calculates the coordinates of the node 100 from the foregoing information and information recorded in the database 133 contained in the positioning server 130 for positioning and ranging.

Referring now to FIGS. 4 to 12, a description will be given of the specific configuration, operational principles, actions, and advantages of the system according to the first embodiment.

Figure 4:
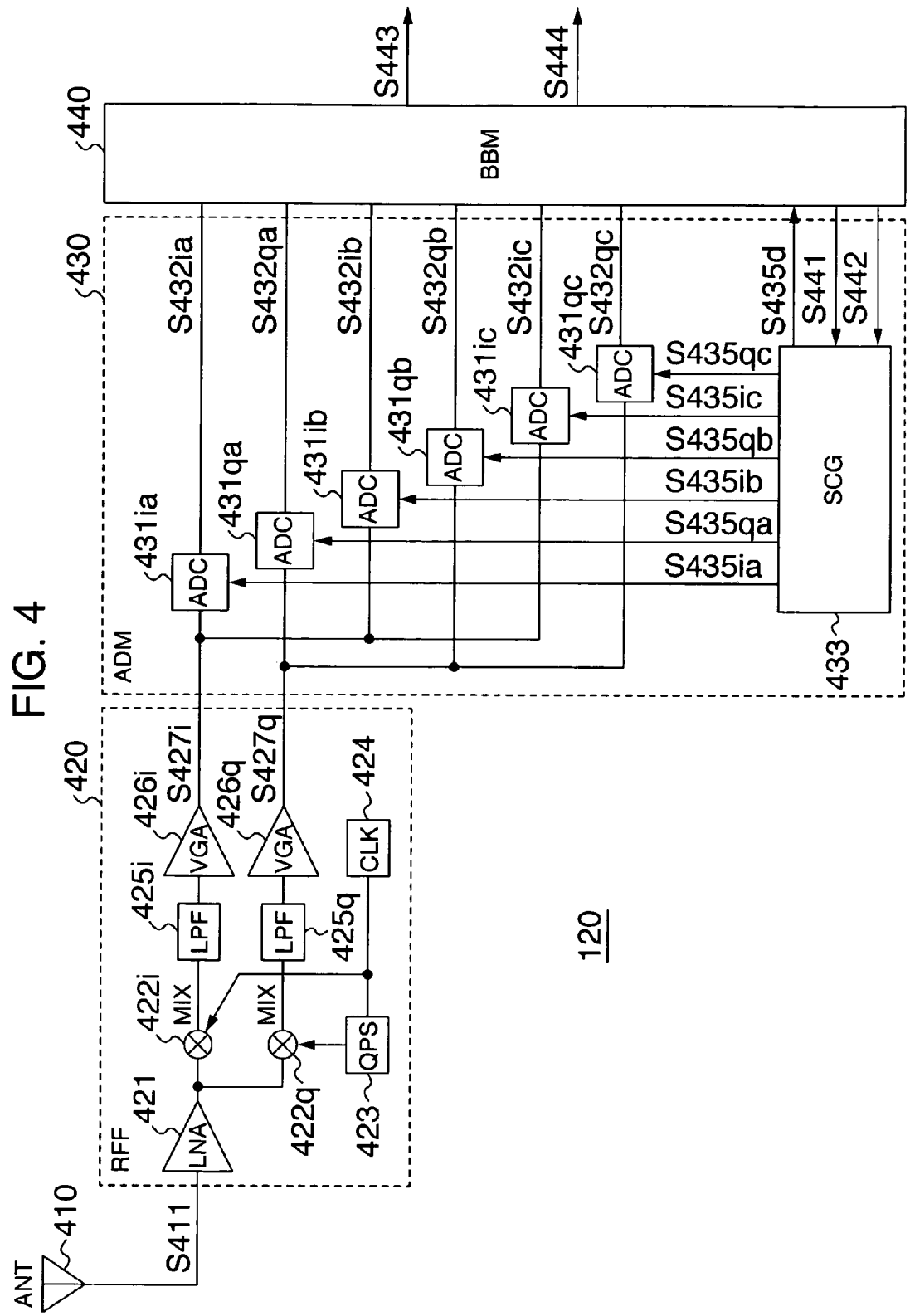
FIG. 4 is a circuit block diagram of a receiver according to the first embodiment of the present invention.

First, the access point 120 according to the present invention comprises a UWB-IR receiver for receiving intermittent impulse sequences, for example, as shown in FIG. 4.

Each of transmitters, which are spatially distributed, transmits a pulse sequence, which has been BPSK (Binary Phase Shift Keying) modulated and directly spread. The pulse sequence propagates through the space and is received by an antenna 410 of the receiver. The signal propagating in the space is, for example, an impulse sequence which has pulses of approximately 2 ns wide transmitted at intervals of approximately 30 ns. The impulse used herein has, for example, a primary Gaussian waveform which has been up-converted by a carrier at approximately 4 GHz.

The receiver comprises the antenna 410, an RF front end unit (RFF) 420, an analog-to-digital conversion module (hereinafter simply called the "A/D conversion module") (ADM) 430, and a baseband module (BBM) 440.

The RF front end unit 420 comprises a low noise amplifier (LNA) 421, mixers (MIX) 422$i$, 422$q$, a $\pi/2$ phase shifter (QPS) 423, a clock generator (CLK) 424, low pass filters (LPF) 425$i$, 425$q$, and variable gain amplifiers (VGA) 326$i$, 426$q$.

It should be noted that suffixes i, q represent an I-signal component (in-phase signal) and a Q-signal component (quadrature signal), respectively, and in the following description, the suffixes i, q are omitted unless they are particularly required.

A pulse signal (intermittent pulse sequence) received from the antenna 410 is amplified by the low noise amplifier 421, and then applied to the mixer 422. The mixer 422 is also applied with a clock signal at approximately 4 GHz generated by the clock generator 424, and as a result, the output of the mixer 422 is separated into a carrier in a 4-GHz band, and an impulse signal having a pulse width of approximately 2 ns in Gaussian waveform. In this event, the mixer 422i is directly applied with the output signal of the clock generator 404 and delivers an I-signal which is an in-phase output signal. On the other hand the mixer 422q is applied with the clock signal from the clock generator 424 after it has passed through the π/2 phase shifter (QPS) 423 to have the phase delayed by π/2, and therefore delivers a Q-signal which is a quadrature component.

The signals separated by the mixers 422 are passed through the low pass filters 425, each of which filters out the carrier at a high frequency of 4 GHz. Consequently, the Gaussian impulse waveforms alone are outputted from the respective low pass filters 425. These impulse signals are amplified by the variable gain amplifiers 426, and outputted from the RF front end unit 440 as an I-signal S427i and a Q-signal S427q, respectively.

The A/D conversion module 430, which comprises A/D converters (ADC) 431, and a sampling clock generator unit (SCG) 433, receives the Gaussian waveform impulse signals of the I-signal S427i and Q-signal S427q which are output signals of the RF front end unit 420 for conversion into digital signals by the A/D converters 431. The resulting digital signals are outputted from the A/D converters 431.

The input signals S427i, S427q are each divided into a plurality of components which are applied to associated A/D converters 431 within the A/D conversion module 430 for conversion into digital signals S432. In each A/D converter 431, a sampling timing for converting the input signal S427 into a digital value is controlled by a sampling clock S435. The sampling clock S435 is provided from the sampling clock generator unit 433, and has a period equal to a pulse repeating period of the received impulse sequence. In other words, the input signals S427 are sampled at timings synchronized to the pulses of the impulse sequence.

Generally, however, a transmitter and a receiver are separately installed through the space, and are not synchronized to each other. Therefore, the phase of the received impulse sequence does not match that of the sampling clock. For this reason, the operation called the "synchronization trap" is required for matching the phase of the received impulse sequence with that of the sampling clock.

Here, a description will be given of two types of clock signals with which the synchronization should be established. A first one is a clock signal at frequency of 4 GHz which is used in the RF front end unit RFF 420 in FIG. 4. A second one is a clock signal at frequency of approximately 32 MHz which supports the impulse sequences that are transmitted at intervals of approximately 30 ns.

As to a 4-GHz signal component, the received signal is divided into an I-component and a Q-component in the RF front end unit RFF 420, and the signal is restored in the baseband module BBM 440. This method permits the signal to be supported without establishing the synchronization in regard to a phase difference.

On the other hand, the impulse sequence at intervals of approximately 32 MHz requires the synchronization trap and synchronization tracking as described below.

Figure 5:
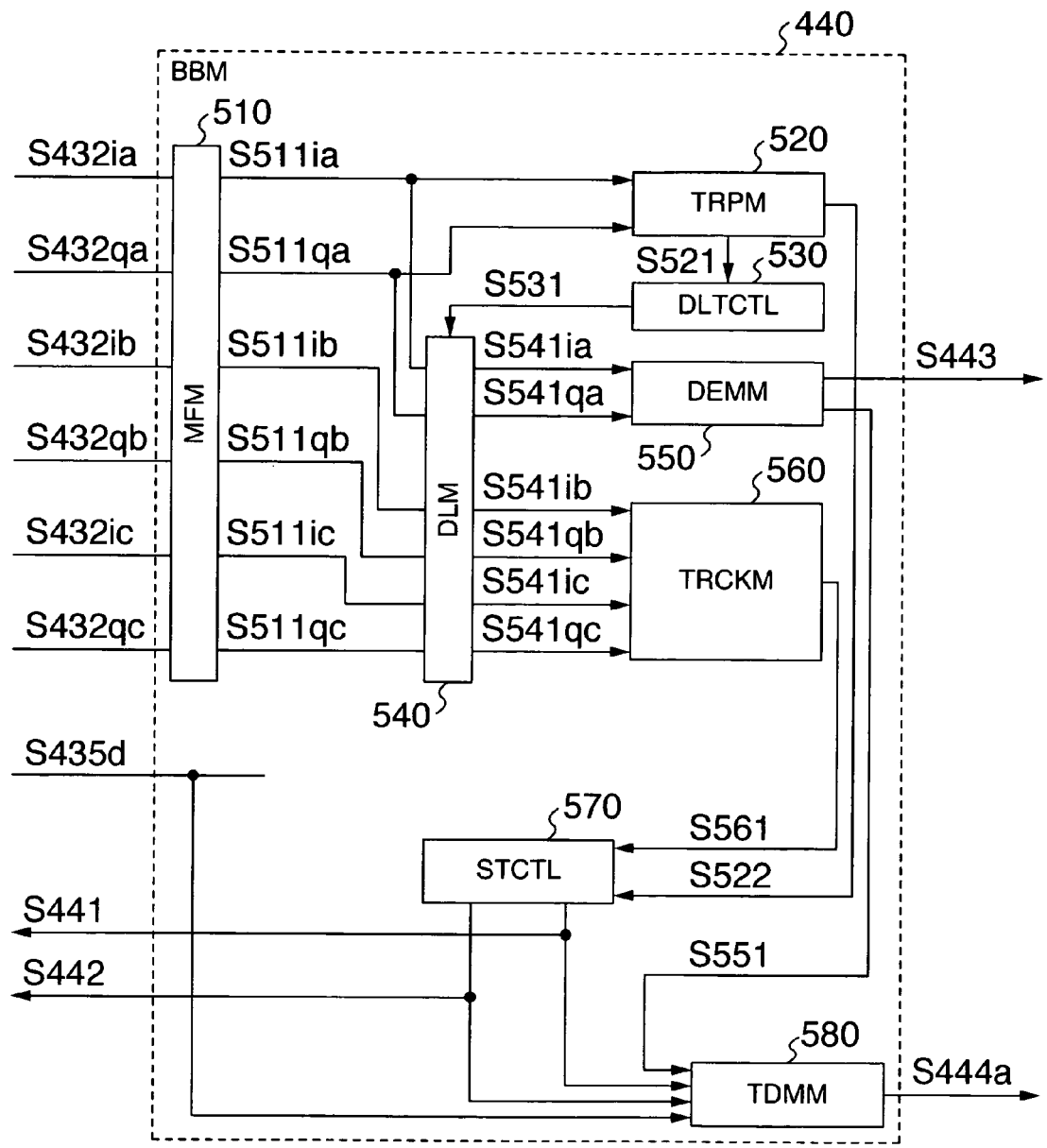
FIG. 5 is a circuit block diagram illustrating the configuration of a baseband module of the receiver, which has a time difference measuring function, according to the first embodiment of the present invention.

FIG. 5 illustrates a block diagram of the baseband module 440. The baseband module 440 comprises a matched filter module (MFM) 510, a synchronization trap module (TRPM) 520, a data latch timing control unit (DLTCTL) 530, a data latch module (DLM) 540, a demodulation module (DEMM) 550, a synchronization tracking module (TRCKM) 560, a sampling timing control unit (STCTL) 570, and a time difference measurement module (TDMM) 580.

The matched filter module 510 detects a matching degree of a plurality of digitized I- and Q-signals S432ia-S432ic and S432qa-S432qc to an expected spread code, and outputs a signal S511 indicative of the result of the measurement.

The synchronization trap module 520 traps the synchronization of the received signal (impulse sequence) using signals S511ia and S511qa. While synchronization trapping is not established, a signal S522 is outputted to the sampling timing control unit 570 to gradually change the timing at which the A/D conversion module 430 converts a received signal into a digital signal using sampling timing control signals S441, S442. Upon establishment of synchronization trap, synchronization timing information is communicated to the data latch timing control unit 530 through a signal S521.

The data latch timing control unit 530 applies a control signal S531 to the data latch module 540 at a timing synchronized with the received signal S511, and the data latch module 540 communicates only data which matches the timing to the demodulation module 550 and synchronization tracking module 560 as a signal S541. The demodulation module 550 demodulates the data based on the signal selected by the data latch module 540, and outputs digital data S443.

On the other hand, the synchronization tracking module 560 detects whether or not the received signal S427 is out of synchronization, based on the signal S541 selected by the data latch module 540. If out-of-synchronization has occurred, the synchronization tracking module 560 adjusts a digital conversion timing of the A/D conversion module 430 with sampling timing control signals S441, S442 through the sampling timing control unit 570.

The sampling timing control unit 570 adjusts the digital conversion timing of the A/D conversion module 430 based on the signals from the synchronization trap module 520 and synchronization tracking module 560. When the signal S522 is outputted from the synchronization trap module 520, the sampling timing control signal S441 is outputted through the sampling timing control unit 570 to delay the digital conversion timing by a short time, for example, approximately 0.5 ns from the normal timing. Specifically, while the period (designated by $T_{ck}$) of the normal digital conversion is equal to the impulse interval, the interval of the digital conversion is increased to $T_{ck}+T_s$ if the signal S441 is outputted, where $T_s$ represents a timing shift time for the digital conversion when the signal S441 is outputted.

Also, the digital conversion timing is adjusted in response to an output signal S561 from the synchronization tracking module 560. When the digital conversion timing advances with respect to the analog signal S427 inputted to the A/D conversion module 430, the synchronization tracking module 520 detects the advancing timing which is communicated to the sampling timing control unit 570 which responsively outputs a control signal S441 to delay the digital conversion timing by $T_s$ from the normal timing. Conversely, when the digital conversion timing is delayed with respect to the analog signal S427, the control signal S442 is outputted to advance the digital conversion timing by $T_s$ from the normal timing.

Specifically, when the control signal S441 is outputted from the sampling timing control unit 570, the period of the sampling clock S435 is increased to $T_{ck}+T_s$ only in one period, while when the control signal S442 is outputted, the period of the sampling clock S435 is reduced to $T_{ck}-T_s$ only in one period. By thus controlling the period of the sampling clock S435, it is possible to trap and track the synchronization.

The following description is given of the basic operation of the receiver for receiving the pulse signal in the UWB-IR communication. The pulse signal is received by the antenna 410, and a shaped waveform at a required frequency is extracted by the RF front end unit 420, and converted into a digital signal by the A/D conversion module 430. Then, the baseband module 440 processes the digital signal to extract a communication data S433 which is eventually delivered.

A time difference measurement module 580 is additionally provided for positioning in the baseband module 440 in the UWB-IR receiver of this embodiment. The time difference measurement module 580, which realizes accurate measurements with low power consumption, accurately measures a time difference using the functions inherently provided in the receiver and a relatively low-speed counter.

Figure 6:
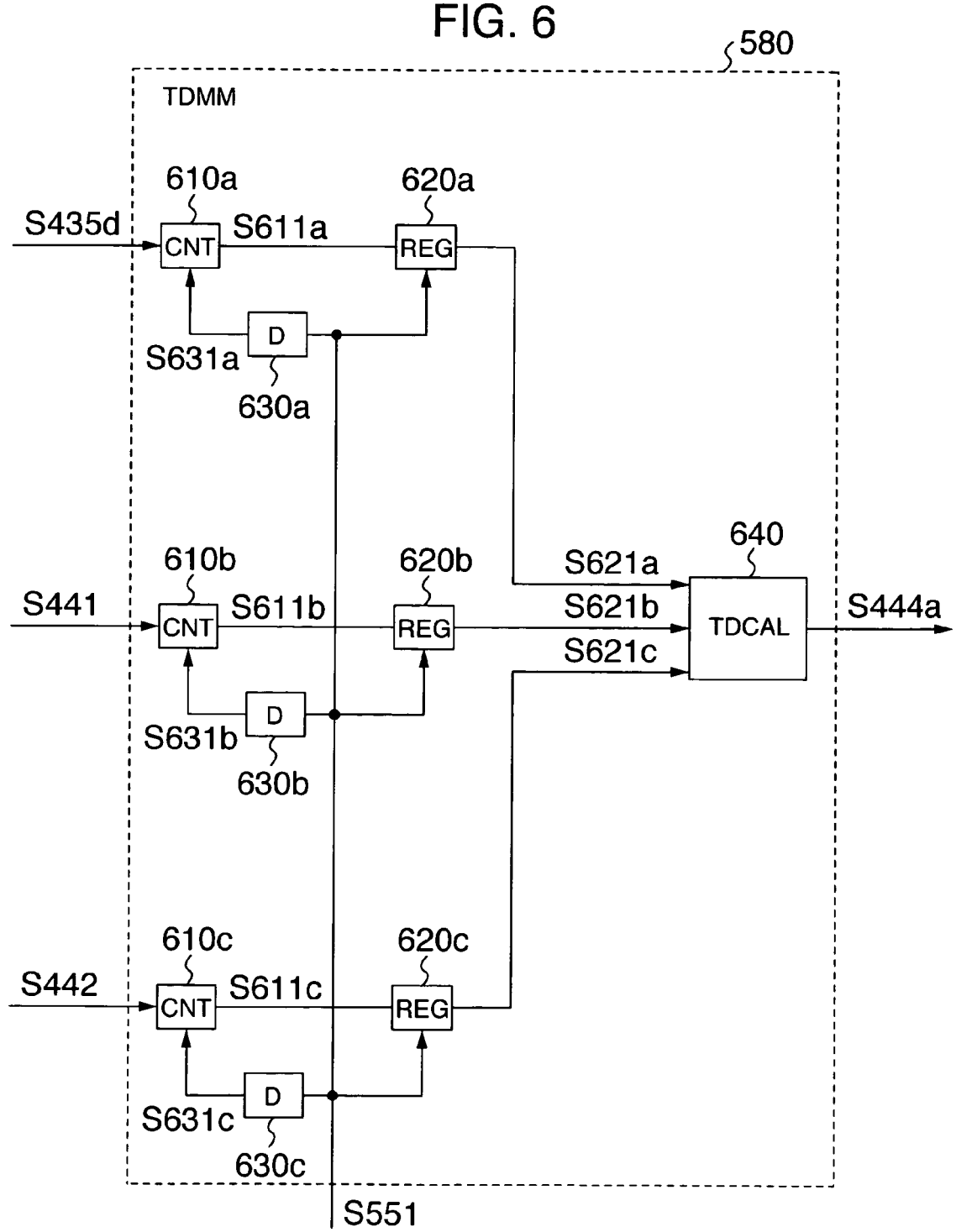
FIG. 6 is a block diagram illustrating the configuration of a time difference measurement module in FIG. 5.

FIG. 6 illustrates an exemplary specific configuration of the time difference measurement module 580 for measuring a time difference. The time difference measurement module 580 comprises a counter (CNT) 610, a register (REG). 620, a delay unit (D) 630, and a time difference calculation unit (TDCAL) 640. The time difference measurement module 580 will be described later in greater detail.

The mechanism of the positioning system according to this embodiment will be described in greater detail with reference to FIGS. 7 and 8, giving an example of positioning a node 100a.

Figure 7:
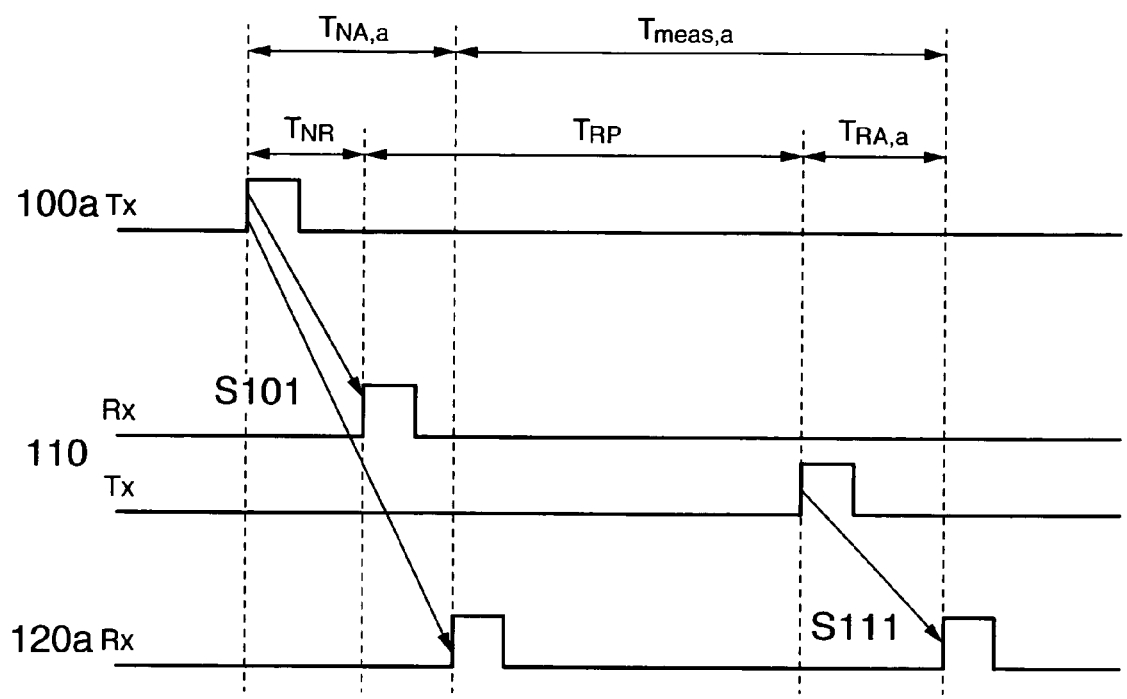
FIG. 7 is a diagram for describing the principles of the positioning system according to the present invention.

Referring first to FIG. 7, a description will be given of the principles of the positioning system according to the present invention.

In FIG. 7, Tx represents a transmission, and Rx a reception. A positioning signal S101 transmitted by the node 100a is received by the reference station 110 after a time $T_{NR}$, and then received by the access point 120a after a time $T_{NA,a}$. The reference station 110 transmits a reference signal S111 after a time $T_{RP}$ from the reception of the positioning signal S101. The reference signal S111 is received by the access point 120a after a time $T_{RA,a}$ from its transmission. The access point 120a measures a time $T_{meas,a}$ from the reception of the positioning signal S101 to the reception of the reference signal S111. In this event, the following equation is established:

$$T_{NR}+T_{RP}+T_{RA,a}=T_{NA,a}+T_{meas,a} \qquad (1a)$$

Also, the positioning signal S101 and reference signal S111 are received by the access points 120b, 120c as well, and the following equations are established:

$$T_{NR}+T_{RP}+T_{RA,b}=T_{NA,b}+T_{meas,b} \qquad (1b)$$

$$T_{NR}+T_{RP}+T_{RA,c}=T_{NA,c}+T_{meas,c} \qquad (1c)$$

where $T_{NR}$ represents a time from the transmission of the positioning signal S101 from the node 100a to the reception of the positioning signal S101 by the reference station 110; $TR_{RP}$ represents a time from the reception of the positioning signal S101 by the reference station 110 to the transmission of the reference signal S111 from the reference station 110; $T_{RA,a}$, $T_{RA,b}$, $T_{RA,c}$ represent times from the transmission of the reference signal S111 from the reference station 110 to the reception of the reference signal S111 by the access points 120a, 120b, 120c, respectively; $T_{NA,a}$, $T_{NA,b}$, $T_{NA,c}$: Times from the transmission of the positioning signal S101 from the node 100a to the reception of the positioning signal S101 by the access points 120a, 120b, 120c, respectively; and $T_{meas,a}$, $T_{meas,b}$, $T_{meas,c}$ represent times from the reception of the positioning signal S101 by the access points 120a, 120b, 102c to the reception of the reference signal S111 by the same, respectively.

The following equation is derived from Equation (1a) and Equation (1b):

$$T_{NA,a}-T_{NA,b}=(T_{RA,a}-T_{RA,b})-(T_{meas,a}-T_{meas,b}) \qquad (2)$$

where $T_{RA,a}$, $T_{RA,b}$ are equal to the distances between the reference station 110 and the access points 120a, 102b divided by the velocity of light. Also, since $T_{meas,a}$, $T_{meas,b}$ are values measured by the access points 120a, 120b, respectively, the right side of Equation (2) provides a known value.

Consequently, it is possible to calculate a difference $T_{NA,a}-T_{NA,b}$ between the time at which the positioning signal S101 arrived at the access point 120a, and the time at which the positioning signal S101 arrived at the access point 120b. While there are three access points in this description, the number of the access points is not limited to this particular value.

Figure 8:
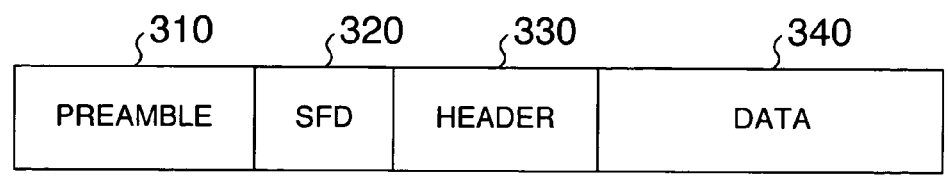
FIG. 8 is a schematic diagram showing a positioning signal transmitted from the node and the reference signal transmitted from the reference station according to the present invention.

FIG. 8 shows an exemplary structure of the positioning signal S101 transmitted from the node 100, and the reference signal S111 transmitted from the reference station 110. The signals S101, S111 are each made up of a preamble 310, a start frame delimiter (hereinafter abbreviated as "SFD") 320, a header 330, and data 340. The header or data may include a CRC code or the like for error correction.

The preamble 310 is used by an access point which has received the signal S101 or S111 to trap the synchronization. The SFD 320 comprises a particular bit pattern indicative of the end of the preamble and the start of the header 330. The header 330 contains information such as the identifier of a source and the identifier of a destination of the signal S101, S111, and the like. The data 340 contains information from the source of the signal S101, S111.

By using the signals S101, S111 for communication, the positioning can be performed simultaneously with a communication. Also, either the node 100 or the reference station 110 need not generate a special signal for the positioning, thus resulting in simplification of the receiver.

A transmission timing or a reception timing of the signal S101, S111 is determined to be a timing at which a certain particular portion thereof is transmitted or received. For example, the transmission timing is defined to be a timing at which the SFD 320 of the signal S101, S111 is transmitted, while the reception timing is defined to be a timing at which it is received.

In this positioning system, the positioning accuracy for the node 100 under measurement depends on the accuracy of the time difference of arrival TDOA, i.e., the accuracy with which the access point 120 measures the time difference $T_{meas}$. The positioning accuracy further depends on measured time errors among a plurality of access points 120a, 120b, 120c. For example, for achieving a positioning accuracy of 30 cm, a required time accuracy is approximately 1 ns. When a time difference is measured with an accuracy of 1 ns, a 1-GHz oscillator and a counter which operates at 1 GHz are generally used. However, the use of such a high-speed oscillator and counter would increase the power consumption and circuit scale.

This embodiment employs a relatively low-speed oscillator and a low-speed counter to accurately measure a time difference to reduce the power consumption and circuit scale.

Details on such a measurement will be described below with reference to FIGS. 9 to 11.

Figure 9:
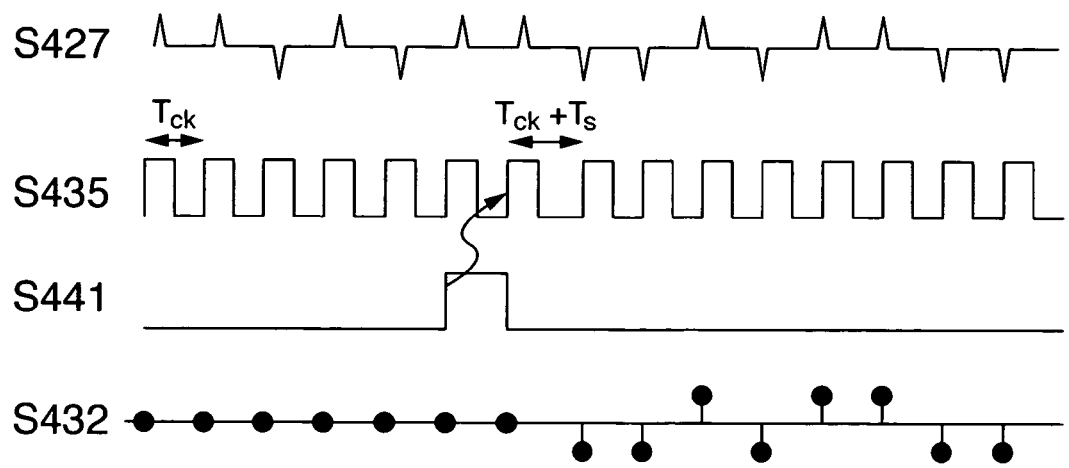
FIG. 9 is a diagram for describing a synchronization trapping method according to the present invention.

Referring first to FIG. 9, a synchronization trapping method will be described. When an impulse sequence S427 inputted to the A/D conversion module 430 is not in phase with the sampling clock S435, the digital signal S432 A/D-converted from the impulse sequence S427 has a noise level value. When the impulse sequence S427 is in phase with the sampling clock S435, sampled pulses are outputted to the digital signal S432.

The digital signal S432 is inputted to the baseband module 440 which determines from the level of the signal S432 whether the impulse sequence S427 is in phase with the sampling clock S435. When they are not in phase, a shift signal (timing shift time=$T_s$) is generated to adjust the phase.

Specifically, the sampling timing control signal S441 is outputted to increase or reduce the period of the sampling clock signal S435 by a certain time ($T_s$) to shift the sampling timing. This operation is repeated until the impulse sequence S427 becomes in phase with the sampling clock S435. In this way, the phase of the sampling clock S435 is shifted by the sampling timing control signal S441 to carry out the synchronization trap with the impulse sequence S427.

The A/D converters 431ia, 431ib, 431ic of the A/D conversion module 430 are applied with sampling clocks which are delayed, for example, by 0.5 ns from one another. Specifically, when the Gaussian impulse signal has a width of 2 ns, this impulse signal is converted into a digital value at positions shifted by 0.5 ns from one another, and the resultant digital values are outputted from the A/D converters 431ia, 431ib, 431ic. These digital values converted at different positions are used for the synchronization tracking.

Even after the synchronization trap is once established, the impulse sequence becomes gradually out of synchronization with the sampling clock if a frequency deviation is present in clocks used in the transmitter and receiver. In the UWB-IR scheme, the synchronization must be established to an impulse having a short duration of approximately 2 ns. While the synchronization tracking is not needed if the transmitter and receiver employ crystal oscillators, which exhibit high frequency accuracies, for use in generating the clocks, the accurate crystal oscillator is expensive. For aiming at a reduction in cost, a system must be able to receive even using a low-accuracy crystal oscillator. For this purpose, the operation called the synchronization tracking is required.

This synchronization tracking will be described with reference to FIGS. 10 and 11.

Figure 10:
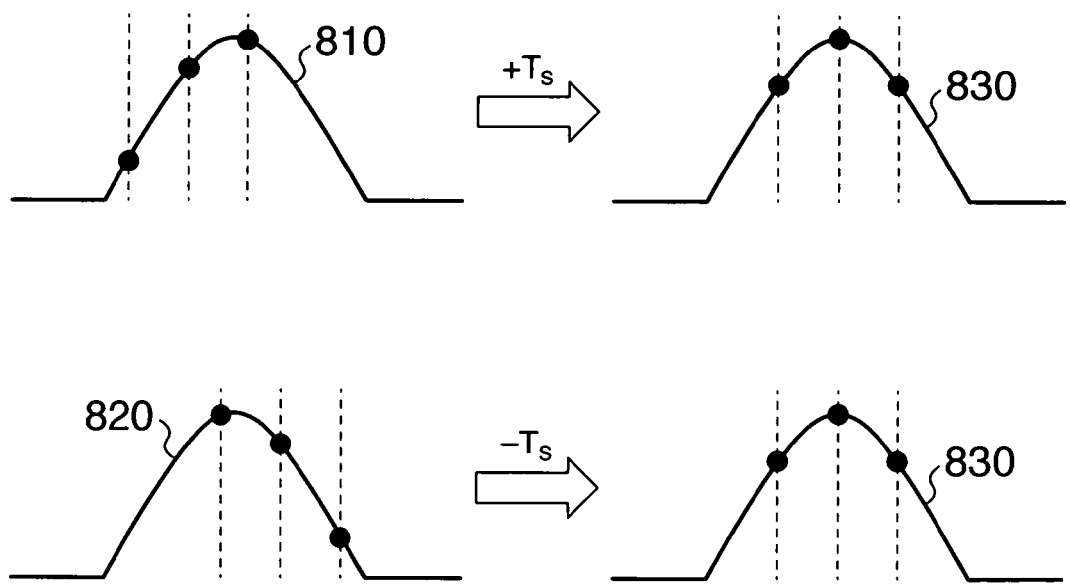
FIG. 10 is a diagram for describing a synchronization tracking method according to the present invention.
Figure 11:
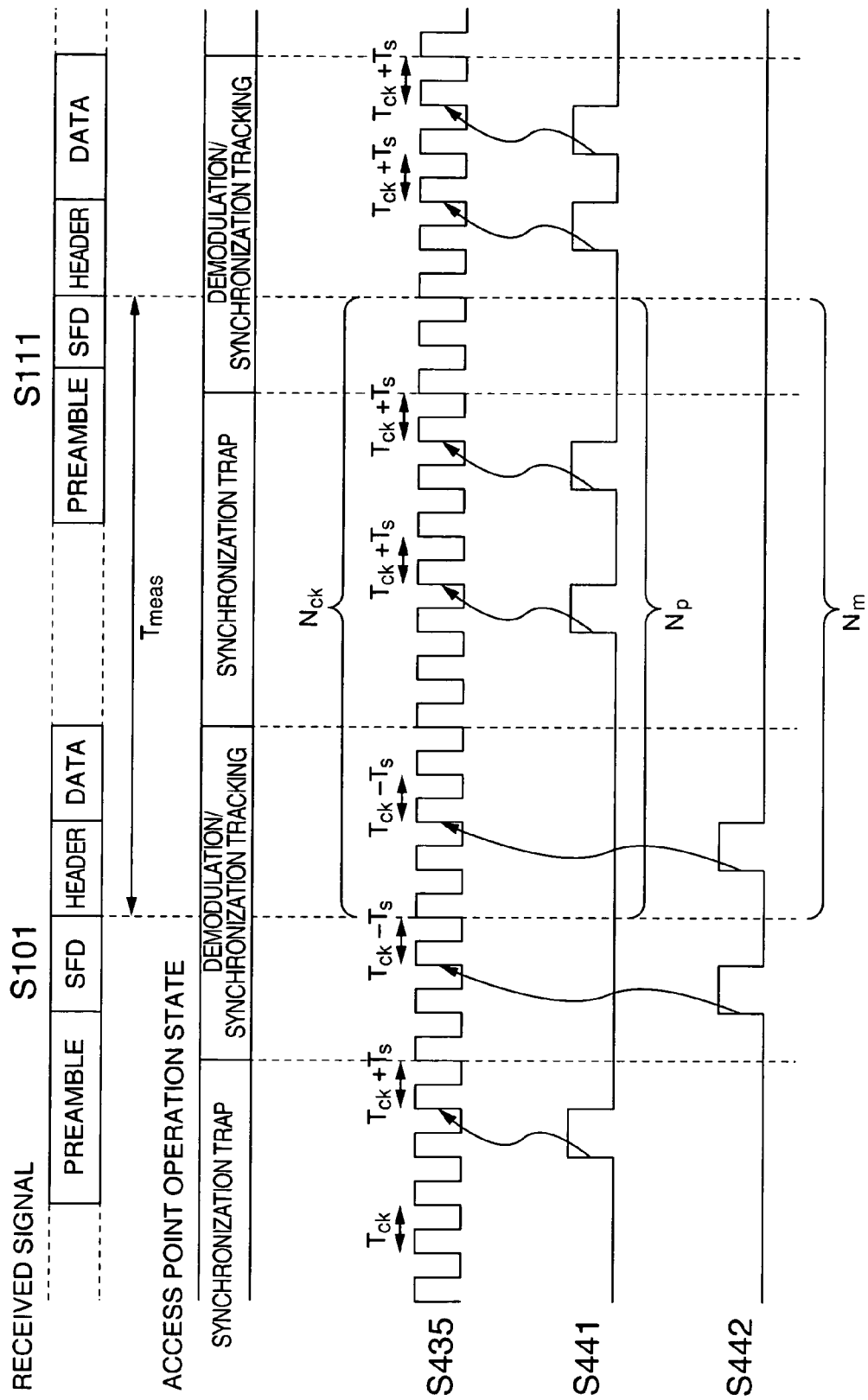
FIG. 11 is a diagram for describing a time difference measuring method according to the present invention.

First, in FIG. 10, from a state 830 in which a pulse is sampled at a peak thereof, a frequency deviation causes a shift between the peak of the pulse and the sampling timing, as shown in states 810, 820.

The baseband module 440 detects this shift using digital signals S432 which have been A/D-converted at three points, and adjusts the period of the sampling clock S435 through the control signals S441, S442. Specifically, when the sampling clock S435 advances with respect to the impulse as shown in the state 810, the period of the sampling clock S435 is extended by a certain time ($T_s$) by the shift signal. On the other hand, when the sampling clock S435 delays with respect to the impulse as shown in the state 820, the period of the sampling clock S435 is reduced by the certain time ($T_s$) by the shift signal.

As described above, the sampling clock generator unit 433 generates sampling clocks S4335ia-S4335ic, S435qa-S435qc for determining the sampling timing of the A/D converter 431 in response to the sampling timing control signals S441, S442 applied from the baseband module 440.

The baseband module 440 performs such signal processing as synchronization trap, synchronization confirmation, signal demodulation, synchronization tracking, and time difference measurement using the received signal S432 converted into digital values, and controls the sampling timing for the A/D conversion module 430. Demodulated data S443 and positioning data S444 are outputted from the baseband module 440, and transmitted to a higher-level layer which processes the data S443 and S444.

Next, the principles of the time difference measurement will be described with reference to FIG. 11. FIG. 11 is a timing chart of a receiver in the access point 120 when it receives the positioning signal S101 and reference signal S111. Before the establishment of the synchronization trap with the positioning signal S101, the period of the sampling clock S435 is varied by the sampling timing control signal S441 to trap the synchronization. As the positioning signal S101 is received and the synchronization trap is established, the baseband module 440 starts the demodulation and synchronization tracking are started.

Since frequency deviations are included in the clocks of the transmitter and receiver, the synchronization is gradually lost even after the synchronization has been once established. The synchronization tracking module 560 detects a shift from the synchronization, and adjusts the period of the sampling clock S435 through the control signals S441, S442.

Upon complete receipt of the data 340 in the positioning signal S101, the receiver performs the synchronization trap. The receiver performs the demodulation and synchronization tracking after the synchronization trap has been established with the reference signal S111.

The access point 120 measures the time difference $T_{meas}$ from the reception of the positioning signal S101 to the reception of the reference signal S111. Assume herein that the time at which the signal S101, S111 is received is a time at which the SFD 320 has been received.

The sampling clock S435 generally has a period $T_{ck}$ which, however, is increased to $T_{ck}+T_s$ or reduced to $T_{ck}-T_s$ when the control signal S441 or S442 are outputted, respectively. Making use of these values, the reception time difference $T_{meas}$ between the positioning signal S101 and reference signal S111 is given by the following equation:

$$T_{meas}=T_{ck} \cdot N_{ck}+T_s \cdot (N_p-N_m) \qquad (3)$$

where $T_{ck}$ represents a normal sampling clock period; $T_s$, a timing shift time; $N_{ck}$, the number of counted pulse sampling clocks; and $N_p$, $N_m$, the numbers of counted sampling timing control signals+$T_s$, −$T_s$.

In other words, the reception time difference $T_{meas}$ is calculated by counting the numbers of the sampling clocks S435 and its control signals S441, S442.

This reception time difference $T_{meas}$ is calculated by the time difference measurement module (TDMM) 580 (see FIG. 6). Next, the operation of the time difference measurement module 580 will be described. The time difference measurement module 580 is applied with a sampling clock S435d, the sampling timing control signals S441, S442, and an SFD detection signal S551. The clock S435d and control signals S441, S442 are inputted to counters 610a-610c, respectively, which deliver signals S611a-S611c indicative of their respective count values.

The SFD detection signal S551 is outputted from the demodulation module 550 at a timing at which the SFD 320 is detected. The count values S611a-S611c are stored in registers 620a-620c, respectively, at a timing at which the SDF 320 is detected. Also, the SFD detection signal S551 is delayed by a delay unit 630, and resets the count values of the counters 610.

The time difference calculation unit 640 calculates the reception time difference $T_{meas}$ in accordance with Equation (3) using the values stored in the registers 620. The time difference $T_{meas}$ is outputted to a higher-level layer as a signal S444a. The higher-level layer identifies the ID and the like of the node 100 from demodulated data S443, and transmits necessary information and the reception time difference $T_{meas}$ to the positioning server 130. The positioning server 130 calculates the position of the node 100 based on the data from the access point 120.

The reception time difference $T_{meas}$ may be calculated by the higher-level layer, positioning server 130 or the like instead of the time difference measurement module 580.

Also, the $T_{meas}$ measuring start time and end time may not be the time at which the SFD is detected. For example, the measurement may be started from the end of data in the positioning signal S101. In this event, a measuring time is reduced as compared with the example described above, thus making it possible to reduce the number of bits of the counter and consequently reduce the circuit scale.

Before the synchronization trap is not established, the sampling timing control signal S441 is periodically outputted. This is because a certain time is taken to determine whether or not the synchronization is trapped. Making use of this fact, the number of the sampling clocks S435d in the meantime can be calculated from the number of counted sampling timing control signals S441.

The foregoing description has been given of a method and circuit for accurately measuring the reception time difference $T_{meas}$ with low power consumption. Specifically, the numbers of the sampling clocks S435 and sampling timing control signals S441, S442 are counted, and the reception time difference $T_{meas}$ is calculated in accordance with Equation (3).

Figure 12:
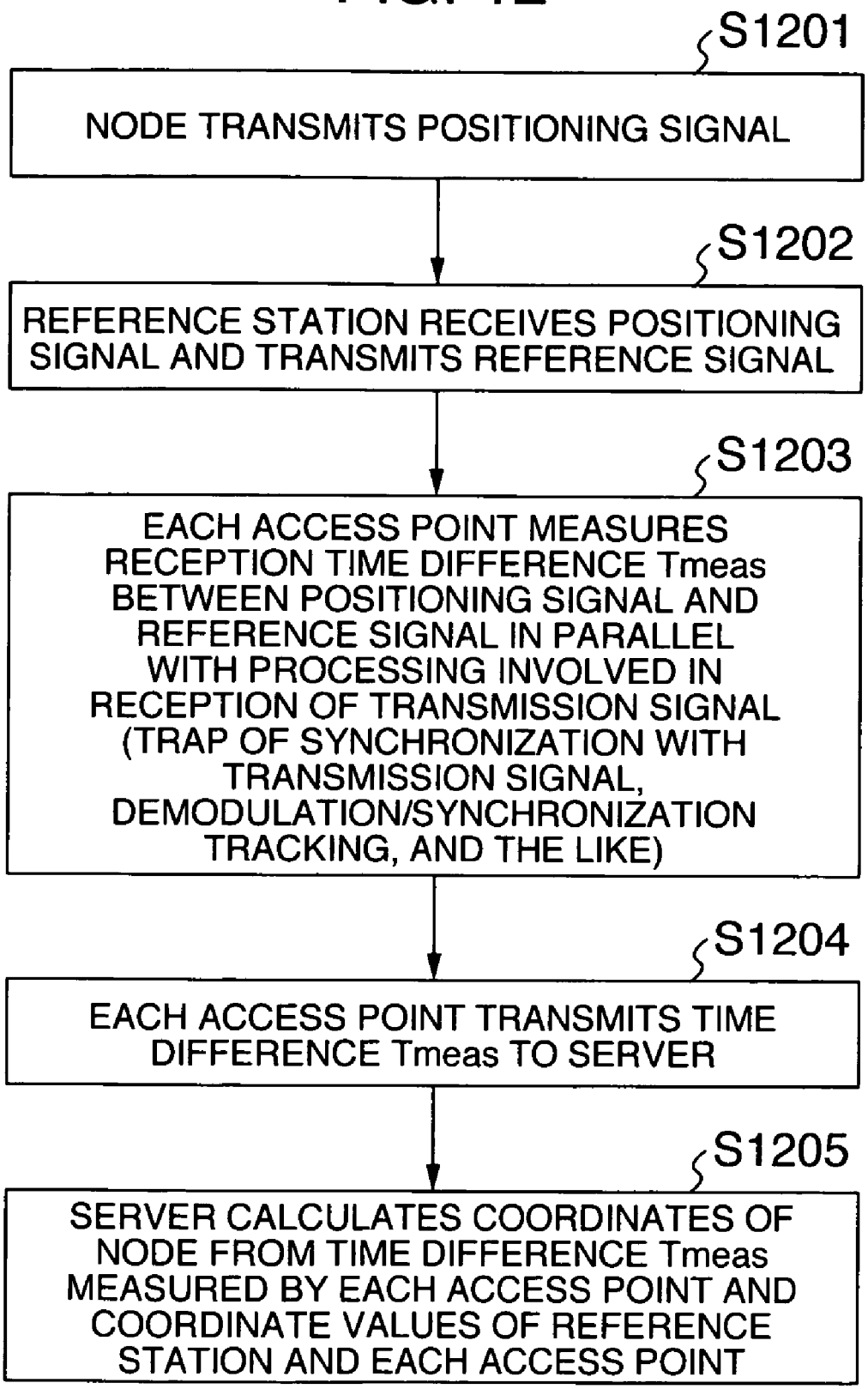
FIG. 12 is a flow chart illustrating an overall positioning/ranging process according to the first embodiment of the present invention.

FIG. 12 illustrates a flow chart of an overall positioning/ranging process according to this embodiment.

A node 100 transmits a transmission signal including a positioning signal S101 to neighboring reference station 110 and access points 120 at an arbitrary time at which the node 100 desires the calculation of the position (S1201). The reference station 110 transmits a transmission signal including a reference signal S111 after it has received the positioning signal S101 (S1202). Each of the reference station 110 and access points 120 sends a transmission signal including, for example, the positioning signal receiving time, the reference signal receiving time, an ID for identifying the access point, and other information to the positioning server 130 through the network 140.

Here, upon receipt of the transmission signal, for example, the positioning signal S101, each access point 120 performs the synchronization trap of the positioning signal S101 with the sampling clock. After the establishment of the synchronization trap, the access point 120 performs the demodulation and synchronization tracking. In parallel with the processing involved in the reception of the transmission signal such as the synchronization trap, demodulation, tracking of the synchronization, and the like, each access point 120 measures a difference $T_{meas}$ between the time at which the positioning signal S101 was received and the time at which the reference signal S111 was received (S1203), and sends information based on the result of the measurement to the positioning server 130 (S1204). The positioning server 130 calculates the coordinates of the node 100 from the foregoing information and information recorded in the database 133 contained in the positioning server 130 for positioning and ranging (S1205).

In this way, by the use of the system of this embodiment which comprises the functions of synchronization trap, synchronization tracking, reception time difference calculation and the like, the time difference can be accurately measured even with the use of a relatively low-speed clock, control signal, and counter. The operating frequency of the counter is the same as the pulse repeating frequency ($1/T_{ck}$), for example, approximately 32 MHz. Since the counter operates at a low frequency, the power consumption and circuit scale can be reduced. Further, the designing is facilitated because the SFD detection signal S551 indicative of the start/end of the measurement of $T_{meas}$ is in synchronism with the sampling clock.

This method exhibits a time measuring accuracy of $\pm T_s$ (timing shift time). Assuming that $T_s$ is chosen, for example, to be 0.5 ns, the accuracy is the same as that when a measurement is made using a 1-GHz oscillator and counter. Specifically, a positioning accuracy can be improved to approximately 30 cm.

As described above, the receiver in the access point according to this embodiment can use a low-speed clock, and control signals for shifting the phase of the clock in measuring a reception time difference between the positioning signal and reference signal. Then, the numbers of the clocks and control signals are counted by low-speed counters, respectively, to calculate the reception time difference. The accuracy of the calculated reception time difference is determined by a time by which the phase is shifted by one control signal. It is therefore possible to measure the time difference with a high accuracy. The measurement of the reception time difference using this method eliminates the need for a high-speed clock or a high-seed counter, and reduces the power consumption and circuit scale.

In the foregoing position detection system, information on the access point may be communicated to the server through a wired or a wireless network. Also, the access point can additionally function as the reference station and positioning server.

For example, the positioning/ranging system may comprise a first communication device for transmitting a positioning signal, and a second communication device for transmitting a reference signal to the first communication device after the positioning signal has been received, wherein the first communication device may comprise a synchronization trap module for generating a shift signal for varying the phase of a clock signal to perform synchronization trap of the reference signal with the clock signal, and a position calculation unit for measuring a time difference from the transmission of the positioning signal to the reception of the reference signal, and calculating the distance between the first communication device and the second communication device using the time difference.

According to this embodiment, the time difference can be accurately measured using a low-speed clock, control signal, and counter, thus achieving accurate positioning by a receiver which is reduced in power consumption, size and cost, without using a high-speed clock or counter.

Second Embodiment

Figure 14:
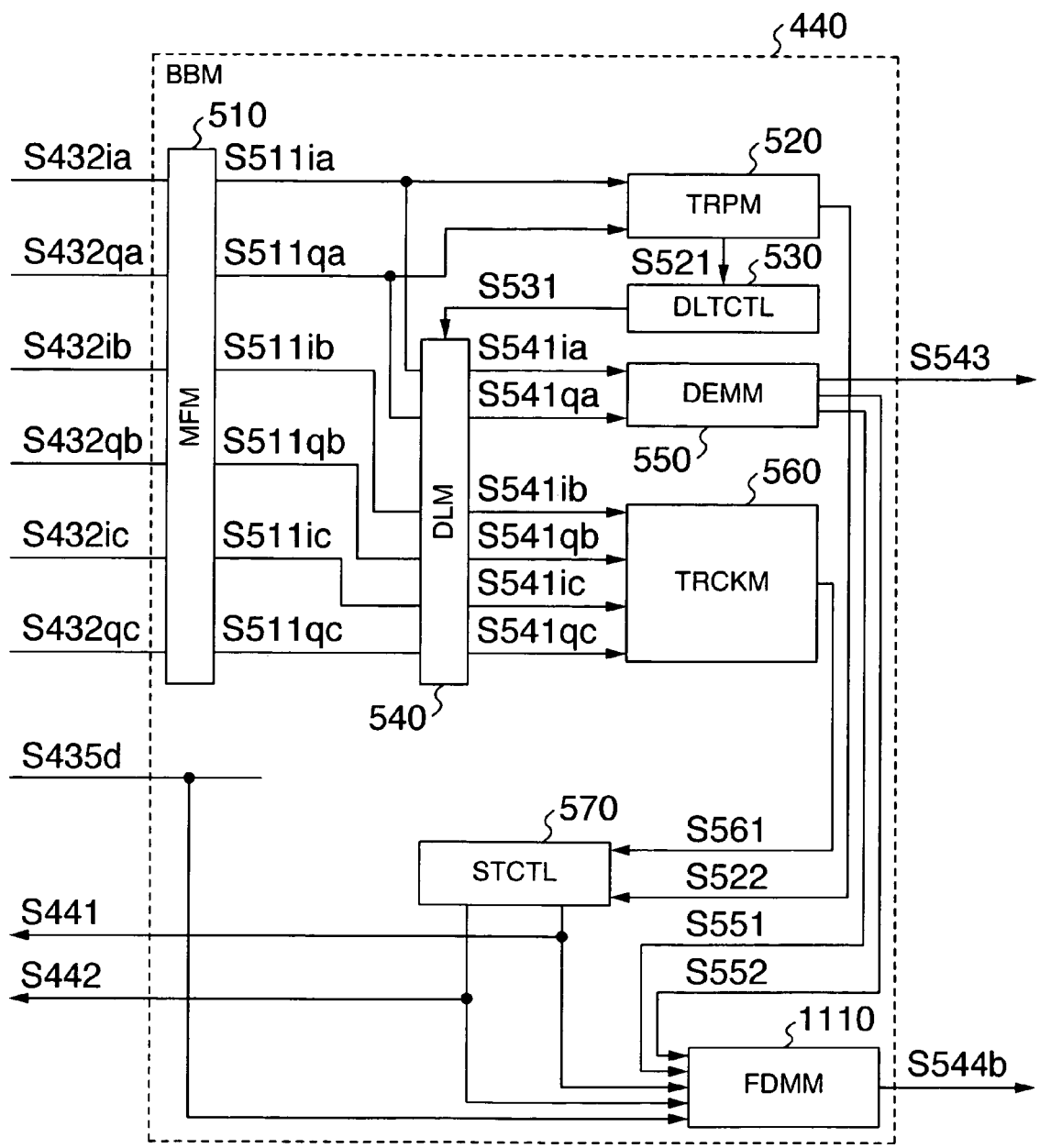
FIG. 14 is a circuit block diagram illustrating the configuration of a baseband module in a receiver, which has a deviation measuring function, according to the second embodiment of the present invention.
Figure 15:
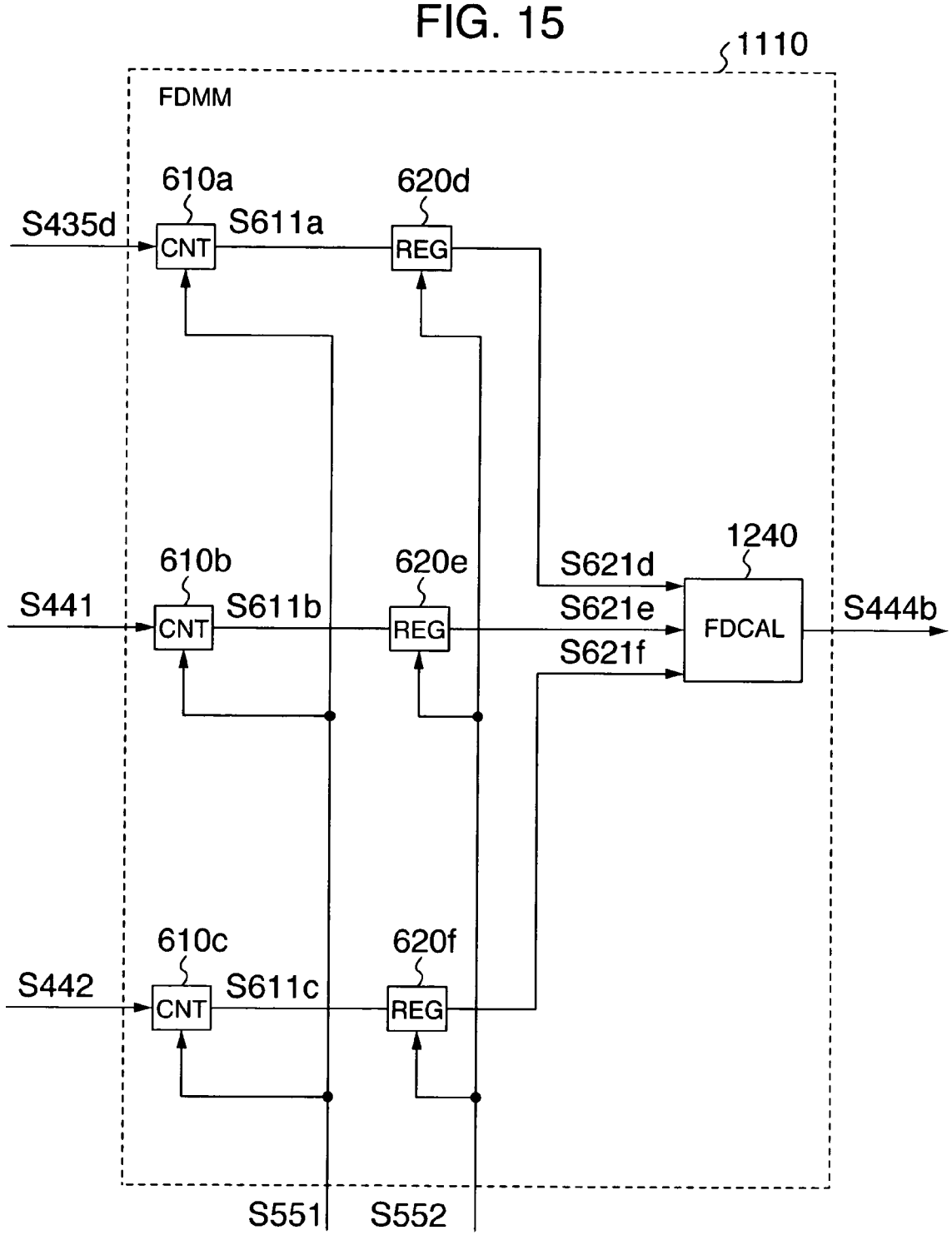
FIG. 15 is a circuit block diagram illustrating the configuration of a frequency deviation measurement module according to the second embodiment of the present invention.

Next, a frequency deviation measuring unit for measuring and reducing a clock error between access points according to a second embodiment of the present invention will be described with reference to FIGS. 13 to 15.

In the first embodiment of the present invention described above, the reception time difference $T_{meas}$ measured by the access point 120 includes an error due to the accuracy of the clock frequency.

The positioning server 130 calculates the position of the node 100 in accordance with Equation (2) using the reception time differences $T_{meas}$ measured by a plurality of access points 120. When a clock error is taken into consideration, the second term on the right side of Equation (2) is:

$$T_{meas,a} - T_{meas,b} = T_{real,a} \cdot (1 + \delta_a) - T_{real,b} \cdot (1 + \delta_b) \quad (4)$$

$$= T_{real,a} - T_{real,b} + (T_{real,a} \cdot \delta_a - T_{real,b} \cdot \delta_b)$$

resulting in an error $(T_{real,a} \cdot \delta_a + T_{real,b} \cdot \delta_b)$, where $T_{real,a}$, $T_{real,b}$ represent real times which should be measured by the access points 120a, 120b, respectively, and $\delta_a$, $\delta_b$ represent deviations of clocks in the access points 120a, 120b.

The error $(T_{real,a} \cdot \delta_a + T_{real,b} \cdot \delta_b)$ is transformed to:

$$T_{real,a} \cdot \delta_a - T_{real,b} \cdot \delta_b = (T_{real,a} - T_{real,b}) \cdot \delta_a + T_{real,b} \cdot (\delta_a - \delta_b) \quad (5)$$

$(T_{real,a} - T_{real,b})$ depends on the distance between the node 100 and the access point 120 and the distance between the reference station 110 and the access point 120, and has a value of approximately 100 ns at most assuming, for example, a positioning system for an area of 30 meters in every direction. On the other hand, $T_{real,b}$ depends on a signal processing time in the reference station 110, the data length of the positioning signal S101, the length of the preamble in the reference signal S111, and the like, and has a value of at least 0.6 ms or more assuming, for example, a transmission rate of 250 kbps and the preamble having a length of 20 bytes. In this event, a time error of approximately 13 ns occurs assuming, for example, that a deviation of the clocks between the access points $(\delta_a - \delta_b)$ is 20 ppm. This is converted to approximately 4 meters of error in distance.

Therefore, in the error expressed by Equation (5), the second term is predominant. Stated another way, a main cause of the error is not an absolute deviation of a clock (deviation from a real time) but a relative deviation of clocks between access points. Accordingly, the error is reduced by reducing the relative deviation of the clocks between the access points.

The frequency deviation measuring unit of this embodiment measures a frequency deviation of clocks in a transmitter and a receiver to reduce a positioning error. Specifically, the frequency deviation measuring unit measures a clock error between access points with reference to the clock frequency of the transmitter to reduce the clock error. The operational principles of the frequency deviation measuring unit will be described below with reference to FIG. 13.

Figure 13:
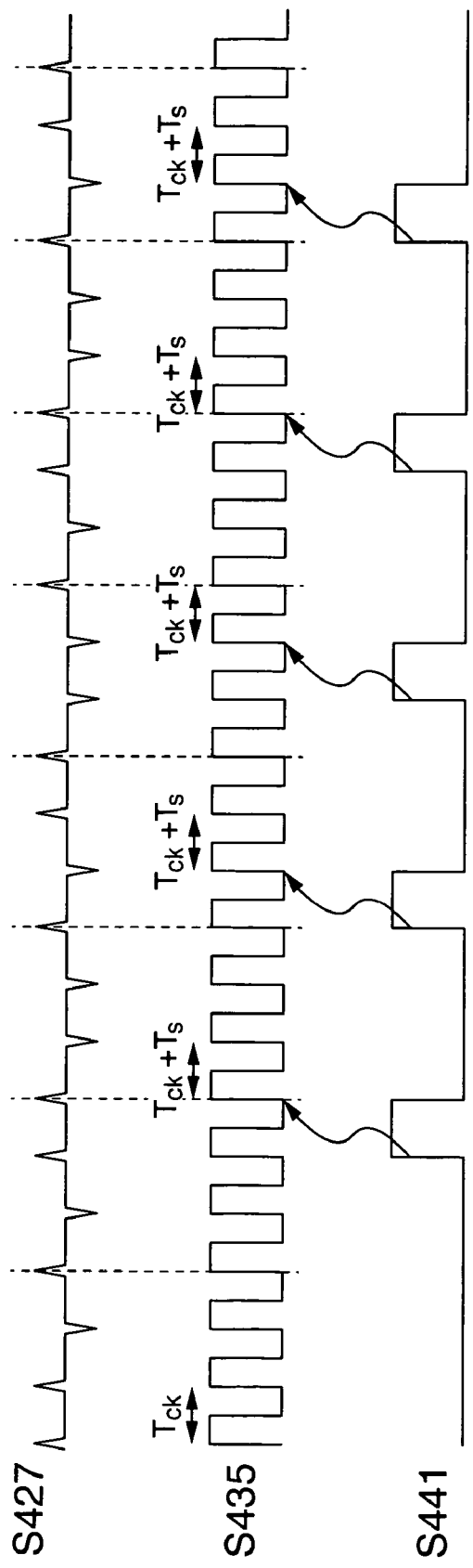
FIG. 13 is a diagram for describing a deviation measuring method according to a second embodiment of the present invention.

FIG. 13 is a timing chart for the A/D conversion module 430 in the access point 120a when it receives the reference signal S111, showing a state after the synchronization has been established with the reference signal S111. In this state, an analog signal S432 inputted to the A/D conversion module 430 is in synchronism with a sampling clock S435. Stated another way, the period of the sampling clock S435 is controlled by the sampling timing control signals S441, S442 to synchronize with the analog signal S432.

Also, since the reference signal S111 is generated by the reference station 110, the analog signal S432 reflects a frequency deviation of the clock in the reference station 110. Therefore, the period at which the control signal S441 is outputted corresponds to a deviation between the clock in the access point 120a and the clock in the reference station 110. This deviation is expressed by:

$$\delta_a - \delta_r = T_s \cdot (N_p - N_m)/T_{ck} \cdot N_{ck} \quad (6)$$

where $\delta_r$ represents the deviation of the clock in the reference station 110.

Specifically, the deviation $(\delta_a - \delta_r)$ is calculated by counting the sampling clock S435 and sampling timing control signals S441, S442. The deviations of the respective access points 120 to the reference station 110 are calculated and corrected by the foregoing method to reduce the error caused by the deviation of the clock frequency.

Next, the configuration of the frequency deviation measuring unit will be described with reference to FIGS. 14 and 15. As illustrated in FIG. 14, the deviation measuring unit comprises a frequency deviation measurement module (FDMM) 1110 in a baseband module BBM 440. FIG. 15 illustrates a specific exemplary configuration of the frequency deviation measurement module 1110.

The frequency deviation measurement module 1110 comprises counters 610a-610c, registers 620d-620f, and a deviation calculation unit (FDCAL) 1240. The frequency deviation measurement module 1110 is applied with a sampling clock S435d, sampling timing control signals S441, S442, an SFD detection signal S551, and a data end signal S552, and outputs a measured deviation S444b. The data end signal S552 is outputted from a demodulation module 550 at the time the end of data 340 is reached in a received signal.

The clock S435d and control signals S441, S442 are inputted to the counters 610a-610c, respectively, which output signals S611a-S611c indicative of their respective count values. The count values S611a-S611c are reset at a SFD detection timing, and stored in the registers 620d-620f, respectively, at a timing the data 340 is over. The frequency deviation calculation unit 1240 calculates a deviation in accordance with Equation (6) using the values in the registers 620d-620f, and outputs the calculated deviation to a higher-level layer.

In the foregoing example, the deviation is corrected using the reference signal S111, but this is not a limitation. Alternatively, the positioning signal S101 from the node 100, a signal from another transmitter, or the like may be used instead for the correction. Also, the timing at which the deviation is measured is not limited to the timing at which the positioning is performed, but the measurement may be made at an arbitrary time, such as at the time of installation, on a periodic basis, or when the temperature changes, and the like. The data on the deviation is stored in a database in the access point 120 or positioning server 130. If the clock frequency deviation has been previously measured between access points in the foregoing manner, a time difference between access points can be measured using the positioning signal arriving times themselves to detect the position of the node.

In this way, the deviation can be corrected to improve the positioning accuracy by measuring the periods at which the control signals S441, S442 are outputted after the establishment of synchronization trap. In addition, when the deviation can be corrected, a positionable range is expanded. For expanding a positionable range, communications are required over a long communication distance at a low transmission rate. At a low transmission rate, a long preamble causes a long time difference $T_{meas}$ to be measured, thus increasing the error resulting from the frequency deviation. By correcting the deviation, this error can be reduced, and the positioning can be made at low transmission rates to expand a positioning range. Also, an inexpensive crystal oscillator with a large frequency deviation can be used, resulting in a reduction in cost.

Further, the frequency deviation measuring unit of this embodiment can be used not only in a positioning/ranging system but also for the maintenance of components of a transmitter or a receiver which utilizes the result of measuring the frequency deviation.

Third Embodiment

Figure 16:
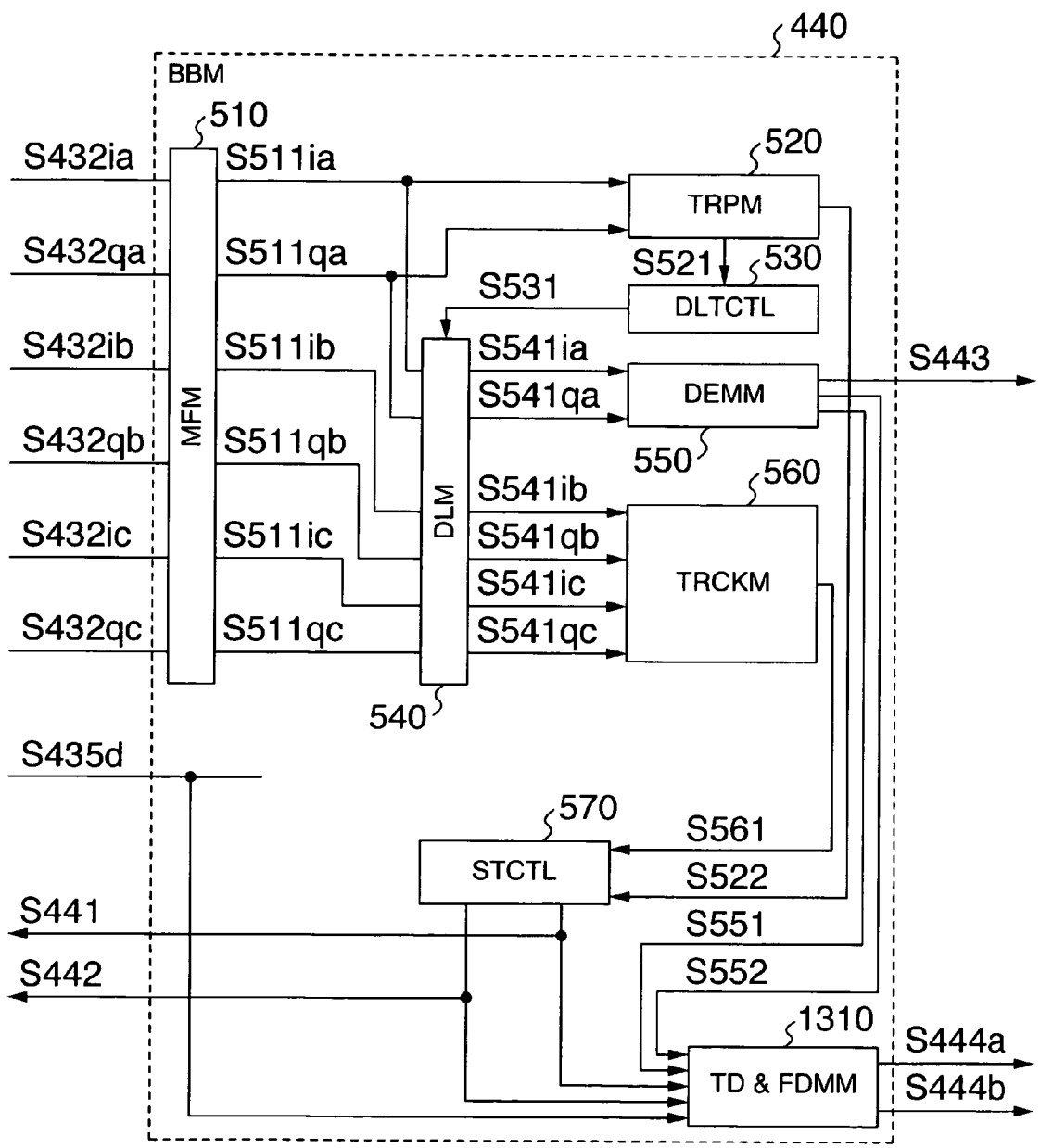
FIG. 16 is a circuit block diagram illustrating the configuration of a baseband module in a receiver, which has a time difference and deviation measuring function, according to a third embodiment of the present invention.
Figure 17:
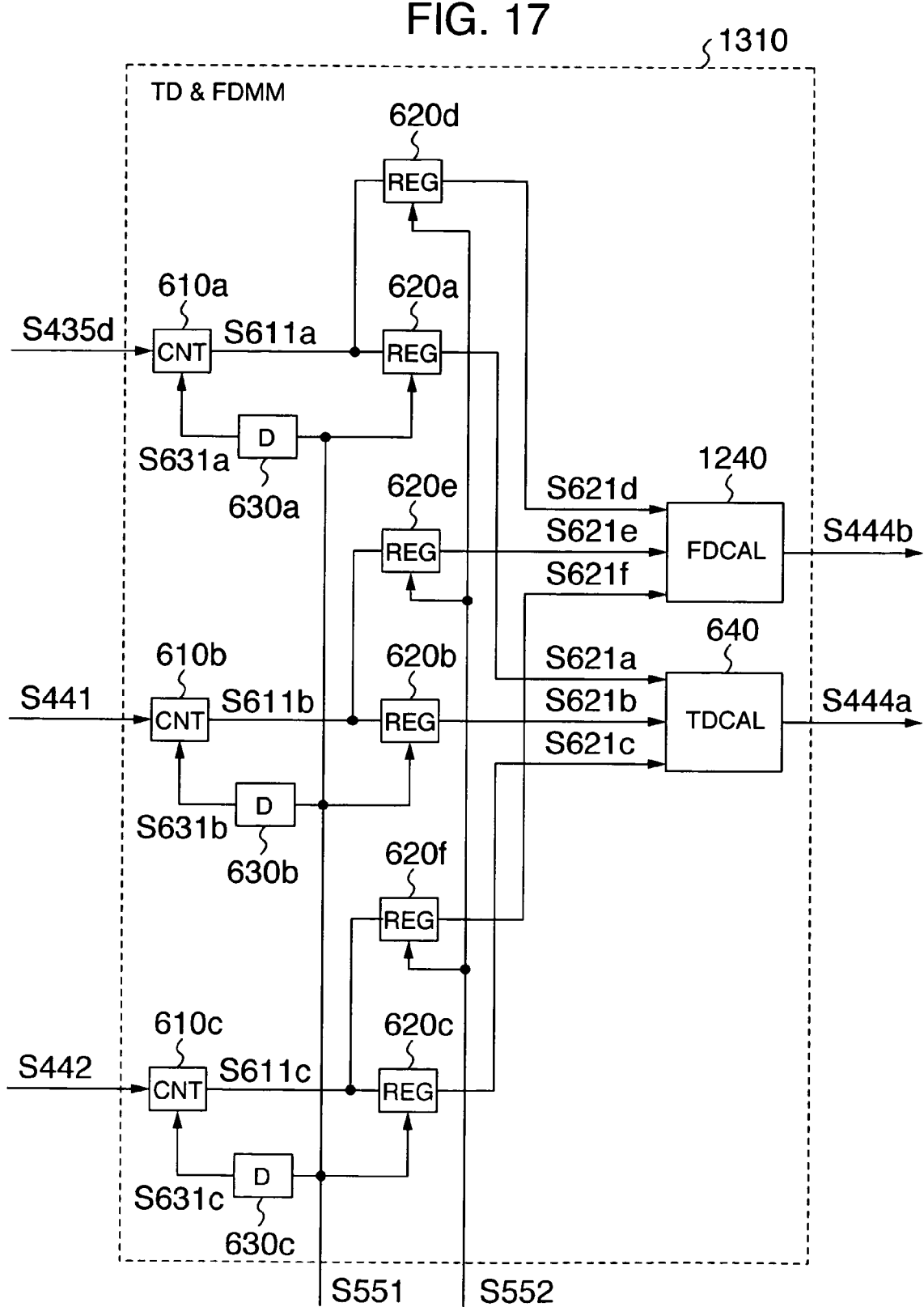
FIG. 17 is a circuit block diagram illustrating the configuration of a time difference and deviation measurement module according to the third embodiment of the present invention.

Next, a third embodiment of the present invention will be described with reference to FIGS. 16 to 19. A receiver of this embodiment comprises the function of the frequency deviation measuring unit in the second embodiment added to the receiver of the first embodiment. FIG. 16 is a diagram illustrating the configuration of a baseband module 440 which comprises a time difference measuring function and a deviation measuring function. FIG. 17 is a diagram illustrating an exemplary configuration of a time difference/frequency deviation measurement module (TD&FDMM) 1310.

In FIGS. 16 and 17, the time difference/frequency deviation measurement module (TD&FDMM) 1310 is applied with a sampling clock S435d, sampling timing control signals S441, S442, an SFD detection signal S551, and a data end signal S552, and outputs a measured time difference S444a and deviation S444b.

The time difference/frequency deviation measurement module 1310 comprises counters 610a-610c, registers 620a-620f, delay units 630a-630c, a time difference calculation unit 640, and a frequency deviation calculation unit 1240. Count values of the counters 610a-610c are stored in the registers 620a-620c, respectively, in response to the SFD detection signal S551, and then, the count values are reset. Also, the count values are stored in the registers 620d-620f, respectively, in response to the data end signal S552.

The time difference calculation unit 640 calculates a time difference $T_{meas}$ in accordance with Equation (3) using the values in the registers 652a-652c. The frequency deviation calculation unit 1240 calculates a deviation of the clock in accordance with Equation (6) using the values in the registers 652d-652f. The calculated values are both outputted to a higher-level layer.

The higher-level layer or positioning server 130 comprises a clock deviation correction unit for correcting an error due to a clock deviation of the reception time difference $T_{meas}$. The positioning server 130 calculates the position of the node 100 using the reception time difference $T_{meas}$ measured by each access point 120.

Figure 18:
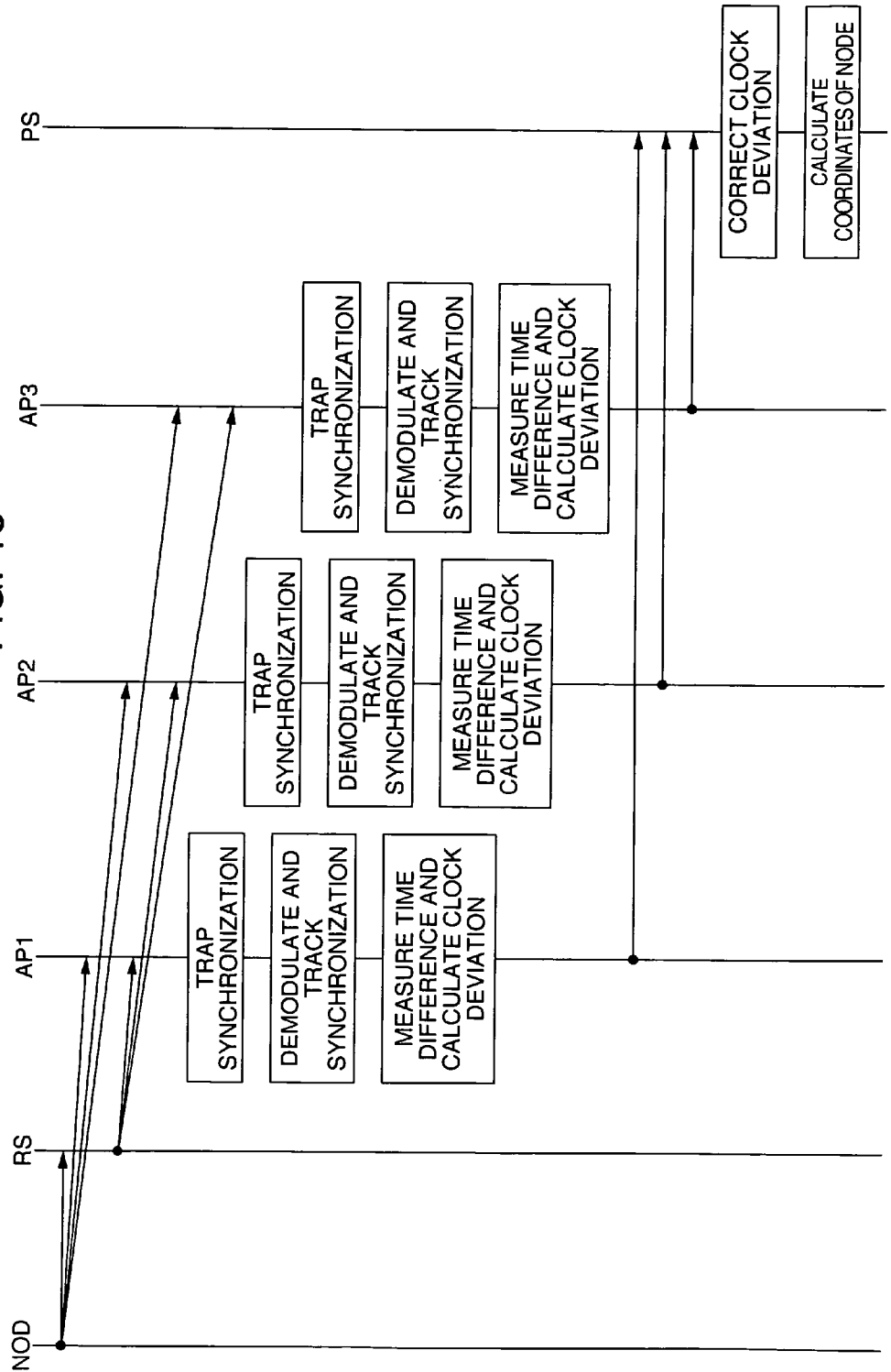
FIG. 18 is a sequence diagram showing an outline of transmission and reception of signals in the positioning/ranging system according to the third embodiment.
Figure 19:
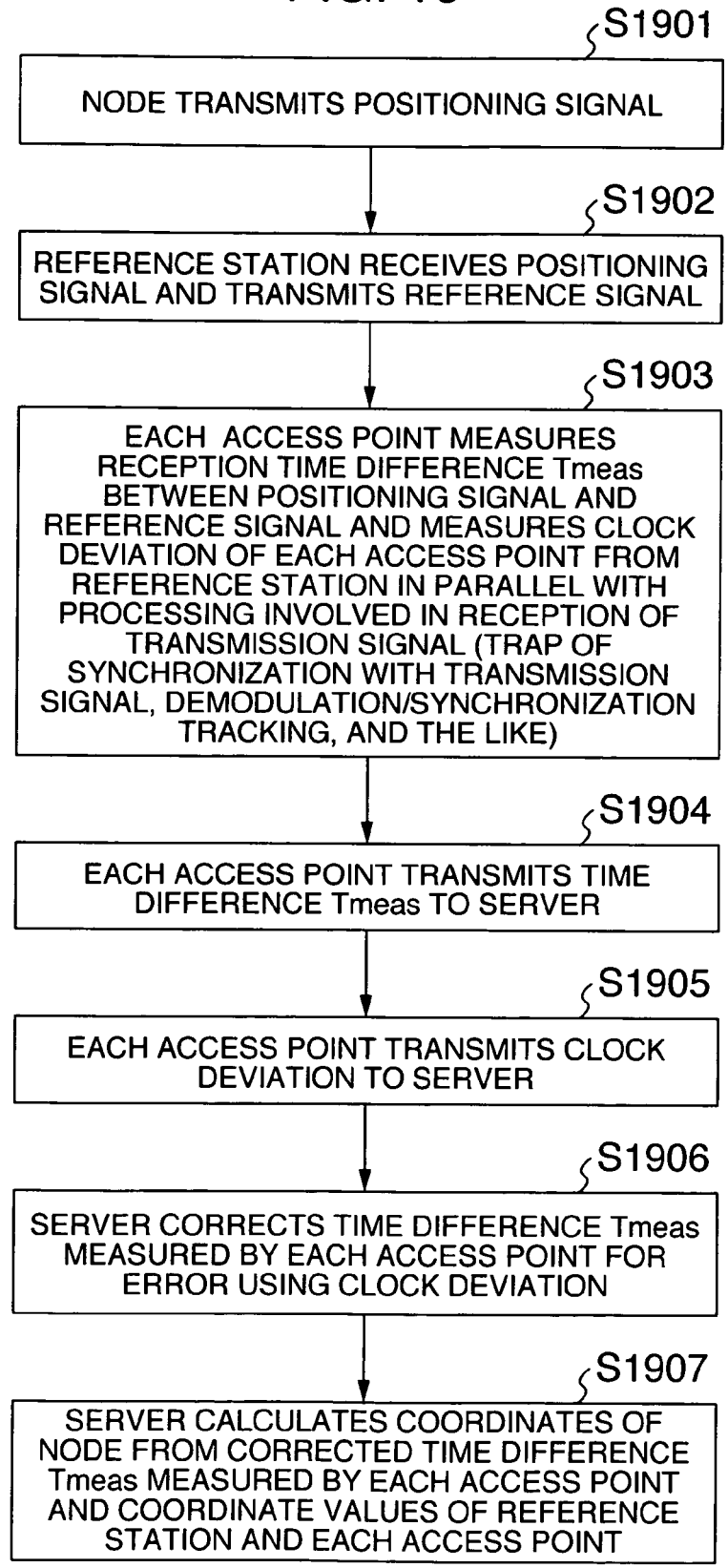
FIG. 19 is a flow chart illustrating an overall positioning/ranging process according to the third embodiment of the present invention.

FIG. 18 is a sequence diagram showing an outline of signal transmission/reception in the positioning/ranging system of this embodiment, and FIG. 19 is a flow chart illustrating an overall positioning/ranging process.

The node 100 transmits a transmission signal including a positioning signal S101 to neighboring reference station 110 and access points 120 at an arbitrary time at which the node 100 desires the calculation of the position (S1901). The reference station 110 transmits a transmission signal including a reference signal S111 after it has received the positioning signal S101 (S1902). Each access point 120 traps the synchronization of the positioning signal with sampling clock upon receipt of the transmission signal, for example, positioning signal S101. After the synchronization trap is established, the access point 120 performs demodulation and synchronization tracking. In parallel with the processing involved in the reception of the transmission signal such as the synchronization trap, demodulation, tracking of the synchronization, and the like, each access point 120 measures a difference $T_{meas}$ between the time at which the positioning signal S101 was received and the time at which the reference signal S111 was received in accordance with Equation (3), and also calculates a deviation of the clock in accordance with Equation 6 (S1903). Each access point 120 sends the reception time difference $T_{meas}$ and the clock deviation based on the result of these measurements to the server 130 (S1904, S1905). The server 130 corrects the reception time difference $T_{meas}$ of each access point for the deviation from the information transmitted thereto and information recorded in the database contained therein (S1906), and calculates the coordinates of the node 100 for positioning and ranging (S1907).

In the foregoing manner, the reception time difference $T_{meas}$ and deviation are calculated from the numbers of the counted sampling clock S435d and sampling timing control signals S441, S442. In this way, an accurate time deviation measurement and positioning can be accomplished by a receiver which is reduced in power consumption, size and cost.

Also, a positioning function can come standard with the receiver. In other words, all nodes having a reception function can serve as positioning access points, thus contributing to the formation of a flexible positioning system.

As described above, according to the third embodiment, errors can be reduced in time difference measurement, the positioning can be made at a low transmission rate, and a positioning range can be expanded by correcting a clock deviation between access points. Also, an inexpensive crystal oscillator with a large frequency deviation can be used, resulting in a reduction in cost.

While the description so far made has been centered on a system comprising the nodes 100, reference station 110, access points 120, and positioning server 130, as illustrated in FIG. 1, the time difference measuring system and deviation measuring system according to the present invention exert their effects in other systems which differ in configuration as well.

For example, the method according to the present invention is effective for measuring the distance between two communication devices. When a first communication device transmits a positioning signal to a second communication device, and the second communication device, which has received the positioning signal, transmits a response signal to the first communication device, the distance therebetween is calculated by measuring a time from the transmission of the positioning signal from the first communication device to the reception of the response signal by the first communication device. With the use of the receiver according to the present invention, the time difference can be measured from the clock and control signals associated therewith to accurately calculate the distance between the two communication devices.

The time measured in the foregoing manner includes a processing time in the second communication device, and can therefore cause an error when the distance is calculated if a deviation is present in the clocks of the two communication devices. However, the method according to the present invention reduces the error in the measured distance by measuring and correcting the deviation.

Fourth Embodiment

While the foregoing description has been made on a receiver for use in an access point in connection with an exemplary receiver which converts a received impulse sequence from an analog form to a digital form at a pulse repetition period, the time difference measuring method and deviation measuring method of the present invention are not limited to this receiver.

For example, a positioning/ranging system according to a fourth embodiment of the present invention effectively employs a receiver having the ability to measure a time difference and a deviation, similar to those in the first to third embodiments, in a communication system which correlates a template waveform with a received signal to trap the synchronization.

Figure 20:
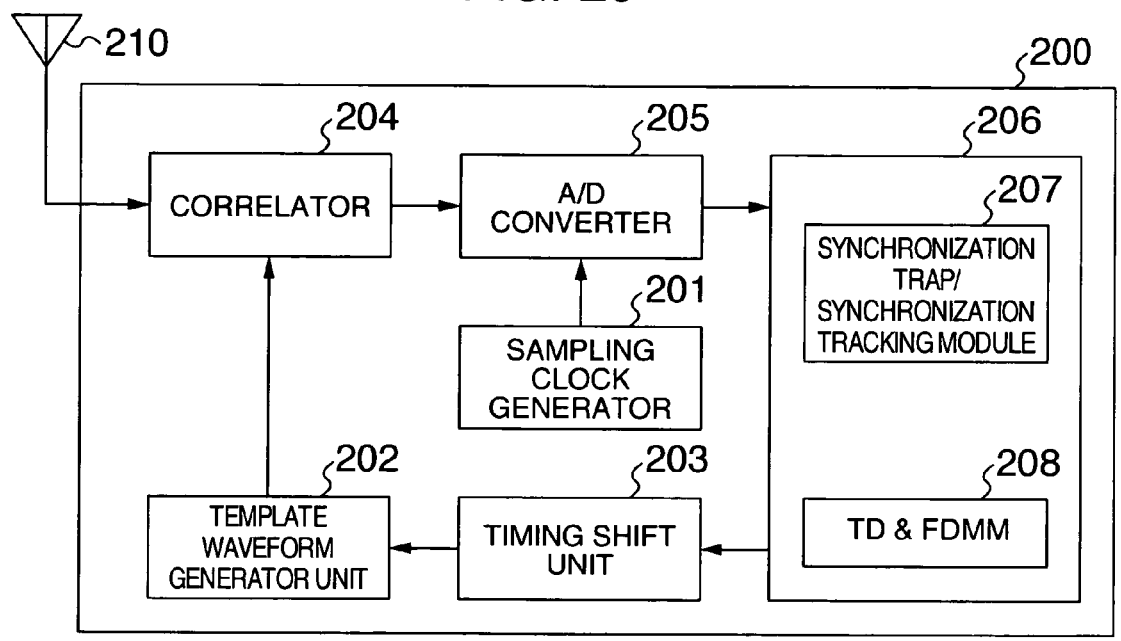
FIG. 20 is a circuit block diagram illustrating a receiver according to a fourth embodiment of the present invention.

FIG. 20 illustrates an exemplary configuration of a receiver 200 according to the fourth embodiment of the present invention. The receiver 200 comprises a template waveform generator unit 202; a timing shift unit 203 for shifting a timing (phase) at which the template waveform is generated; a correlator 204 for correlating the template waveform with a received signal fed through an antenna 210; an A/D converter 205 for analog-to-digital converting an output signal of the correlator 204; a sampling clock generator 201 for providing a timing for the A/D conversion; and a pseudo random code generator unit (not shown). Further, a baseband module (BBM) 206, which comprises a synchronization trap/synchronization tracking function 207 and a deviation measurement module (TD&FDMM) 208, traps the synchronization of a received signal with the template waveform and tracks the synchronization, corrects a clock deviation, and measures the position or distance, using a timing shift function.

The template waveform generator unit 202 generates the template waveform using a pseudo-random code which was used for spreading a signal on the transmission side of the communication system. The correlator 204 correlates the template waveform with a received signal, sends the result of the correlation to the baseband module (BBM) 206 through the A/D converter 205. The synchronization trap/synchronization tracking module 207 detects the time at which the received signal is most correlated with the template waveform, while controlling the timing at which the template waveform is generated. Subsequently, the synchronization trap/synchronization tracking module 207 controls the timing at which the template waveform is generated to maintain the correlation at a high level.

The synchronization trap/synchronization tracking module 207 and time difference/frequency deviation measurement module (TD&FDMM) 208 have functions of synchronization trap for shifting the phase of the template waveform, synchronization tracking, and reception time difference measurement or deviation measurement, as described in the third embodiment. With these functions, the time difference/frequency deviation measurement module (TD&FDMM) 208 counts the number of signals for controlling the timing shift unit 203 and the number of sampling clocks for the A/D converter 205, thereby enabling an accurate time difference measurement and deviation measurement.

According to this embodiment, a time difference can be accurately measured and a clock deviation can be corrected by a receiver which is reduced in power consumption, size, and cost, thereby achieving accurate positioning.

Fifth Embodiment

While the foregoing description has been given of a method of measuring a time difference between received transmission signals from different transmitters, the time difference measuring method according to the present invention is not so limited. For example, when a first transmission signal and a second transmission signal are transmitted from the same transmitter, a receiver having the ability to measure a time difference and a deviation is effectively employed in a manner similar to the first to third embodiments.

In this event, a time difference measured by the receiver corresponds to a distance by which the transmitter has moved until it transmits the second transmission signal after transmitting the first transmission signal. Therefore, when the receiver according to the present invention receives the first transmission signal and second transmission signal transmitted from the same transmitter, the receiver can measure a relative change in the distance between the receiver and the transmitter and a change in the position of the transmitter. Further, an accurate measurement can be achieved by correcting a deviation of the clock frequency in accordance with the deviation measuring scheme of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A receiver for receiving a transmission signal from a transmitter, comprising:
   a reception unit for receiving a first transmission signal and a second transmission signal;
   an A/D conversion unit which includes an A/D converter for converting the first transmission signal and the second transmission signal from an analog form to a digital form and a sampling clock generator unit for generating sampling clocks determining timings at which the A/D converter performs analog-to-digital conversion;
   a phase shift unit for outputting control signals which shift a phase of the sampling clocks;
   a synchronization trap unit for matching phases of the first transmission signal and the second transmission signal with the phase of the sampling clocks by using the control signals;
   a synchronization tracking unit for adjusting the phase of the sampling clocks to maintain synchronization of the first transmission signal and the second transmission signal; and
   a time difference measurement unit for counting respective numbers of the sampling clocks and the control signals and measuring a reception time difference between the first transmission signal and the second transmission signal using the counted numbers of the sampling clocks and the control signals.

2. The receiver according to claim 1, wherein:
   the first transmission signal is a transmission signal including a positioning signal from a node, and the second transmission signal is a transmission signal including a reference signal from a reference station.

3. The receiver according to claim 1, wherein each of the first transmission signal and the second transmission signal is a signal of an ultra-wide band communication scheme.

4. The receiver according to claim 3, wherein: each of the first transmission signal and the second transmission signal is a signal composed of a sequence of directly spread impulses.

5. A positioning and ranging system comprising:
   an access point comprising the receiver according to claim 1;
   a node for transmitting the first transmission signal including a positioning signal; and
   at least one reference station for transmitting the second transmission signal including a reference signal,
   wherein the access point receives the first and second transmission signals.

6. The positioning/ranging system according to claim 5, wherein:
   the access point comprises a function of receiving data included in the first transmission signal and the second transmission signal simultaneously with the measurement of the reception time difference.

7. The positioning/ranging system according to claim 5, wherein the positioning/ranging system comprises:

a plurality of access points each for receiving the first transmission signal and the second transmission signal; and a server connected to the plurality of access points through a network, wherein the reception unit is configured to receive data included in each of the first transmission signal and the second transmission signal simultaneously with measurement of the reception time difference between the first transmission signal and the second transmission signal, and the server comprises a position calculation unit for calculating the position of the node using the time differences measured by the plurality of access points.

8. A positioning and ranging system comprising:

a first communication device including the receiver according to claim 1, and a second communication device for transmitting a reference signal to the first communication device after receiving a positioning signal transmitted by the first communication device, wherein the first communication device comprises:

a synchronization trap unit for generating the control signal for changing a period of the sampling clocks to trap synchronization of the reference signal to the sampling clocks; and a position calculation unit for measuring a time difference from the transmission of the positioning signal to the reception of the reference signal to calculate the distance between the first communication device and the second communication device using the time difference.

9. A receiver for receiving a transmission signal from a transmitter, comprising:

a reception unit for receiving a first transmission signal and a second transmission signal, the reception unit including:

a template waveform generator unit;

a timing shift unit for shifting a phase at which template waveforms are generated according to control signals;

a correlator unit for correlating the template waveforms with the received transmission signals;

an A/D conversion unit which includes an A/D converter for converting an output signal of the correlator unit from an analog form to a digital form and a sampling clock generator unit for generating sampling clocks determining timings at which the A/D converter performs analog-to-digital conversion;

a synchronization trap unit for matching phases of the first transmission signal and the second transmission signal with the phase at which the template waveforms are generated by using the control signals;

a synchronization tracking unit for adjusting the phase at which the template waveforms are generated to maintain synchronization of the first transmission signal and the second transmission signal; and a time difference measurement unit for counting respective numbers of the template waveforms and the control signals and measuring a reception time difference between the first transmission signal and the second transmission signal using the counted numbers of the sampling clocks and the control signals for controlling the timing shift unit.

10. A positioning and ranging system comprising:

an access point comprising the receiver according to claim 9;

a node for transmitting the first transmission signal, the first transmission signal including a positioning signal; and at least one reference station for transmitting the second transmission signal, the second transmission signal including a reference signal, wherein the access point receives the first and second transmission signals.

11. A positioning and ranging system comprising:

a first communication device including the receiver according to claim 9, and a second communication device for transmitting a reference signal to the first communication device after receiving a positioning signal transmitted by the first communication device, wherein the first communication device comprises:

a position calculation unit for measuring a time difference from the transmission of the positioning signal to the reception of the reference signal to calculate the distance between the first communication device and the second communication device using the time difference.

* * * * *